United States Patent
Lee et al.

(10) Patent No.: US 9,557,529 B2
(45) Date of Patent: Jan. 31, 2017

(54) CAMERA DEVICE AND OPTICAL IMAGING LENS THEREOF

(71) Applicant: GeniuS Electronic Optical Co., Ltd.

(72) Inventors: Poche Lee, Taichung (TW); Chih Yang Yeh, Taichung (TW); Tzu-chien Tang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 251 days.

(21) Appl. No.: 14/261,148

(22) Filed: Apr. 24, 2014

(65) Prior Publication Data
US 2015/0168684 A1    Jun. 18, 2015

(30) Foreign Application Priority Data

Dec. 18, 2013  (TW) .............................. 102146952 A

(51) Int. Cl.
G02B 9/60      (2006.01)
G02B 13/00     (2006.01)

(52) U.S. Cl.
CPC ................................ *G02B 13/0045* (2013.01)

(58) Field of Classification Search
CPC ............................. G02B 13/0045; G02B 9/60
See application file for complete search history.

(56) References Cited

U.S. PATENT DOCUMENTS

| 4,976,525 | A | 12/1990 | Matsumura et al. |
| 6,985,309 | B2 | 1/2006 | Shinohara |
| 2011/0205635 | A1* | 8/2011 | Tang ................... G02B 15/177 359/684 |
| 2012/0069140 | A1 | 3/2012 | Tsai |
| 2012/0257287 | A1 | 10/2012 | Huang |
| 2012/0307382 | A1 | 12/2012 | Hsu |
| 2013/0176631 | A1 | 7/2013 | Tsai |
| 2013/0182335 | A1* | 7/2013 | Tsai ................... G02B 13/0045 359/714 |
| 2013/0222893 | A1 | 8/2013 | Ko |

FOREIGN PATENT DOCUMENTS

| CN | 102193177 | 9/2011 |
| CN | 201965287 | 9/2011 |
| CN | 202149966 | 2/2012 |
| CN | 202494827 | 10/2012 |
| CN | 103064175 | 4/2013 |
| TW | M368072 | 11/2009 |
| TW | M370083 | 12/2009 |
| TW | 201241502 | 10/2012 |
| TW | 201317618 | 5/2013 |

OTHER PUBLICATIONS

Official Action from Taiwan Patent Application No. 102146952 dated Aug. 25, 2014.
Official Action from Chinese Patent Application No. 201310697937.4 dated Nov. 4, 2015.
Office action dated Nov. 8, 2016 in corresponding Chinese Patent Application No. 201310697937.4.

* cited by examiner

*Primary Examiner* — Joseph P Martinez
(74) *Attorney, Agent, or Firm* — Baker & McKenzie LLP

(57) ABSTRACT

The present invention provides a camera device and an optical imaging lens thereof. The optical imaging lens comprises five lens elements positioned in an order from an object side to an image side. Through controlling the convex or concave shape of the surfaces of the lens elements, the view angle of the optical imaging lens is efficiently increased to provide better optical characteristics.

18 Claims, 30 Drawing Sheets

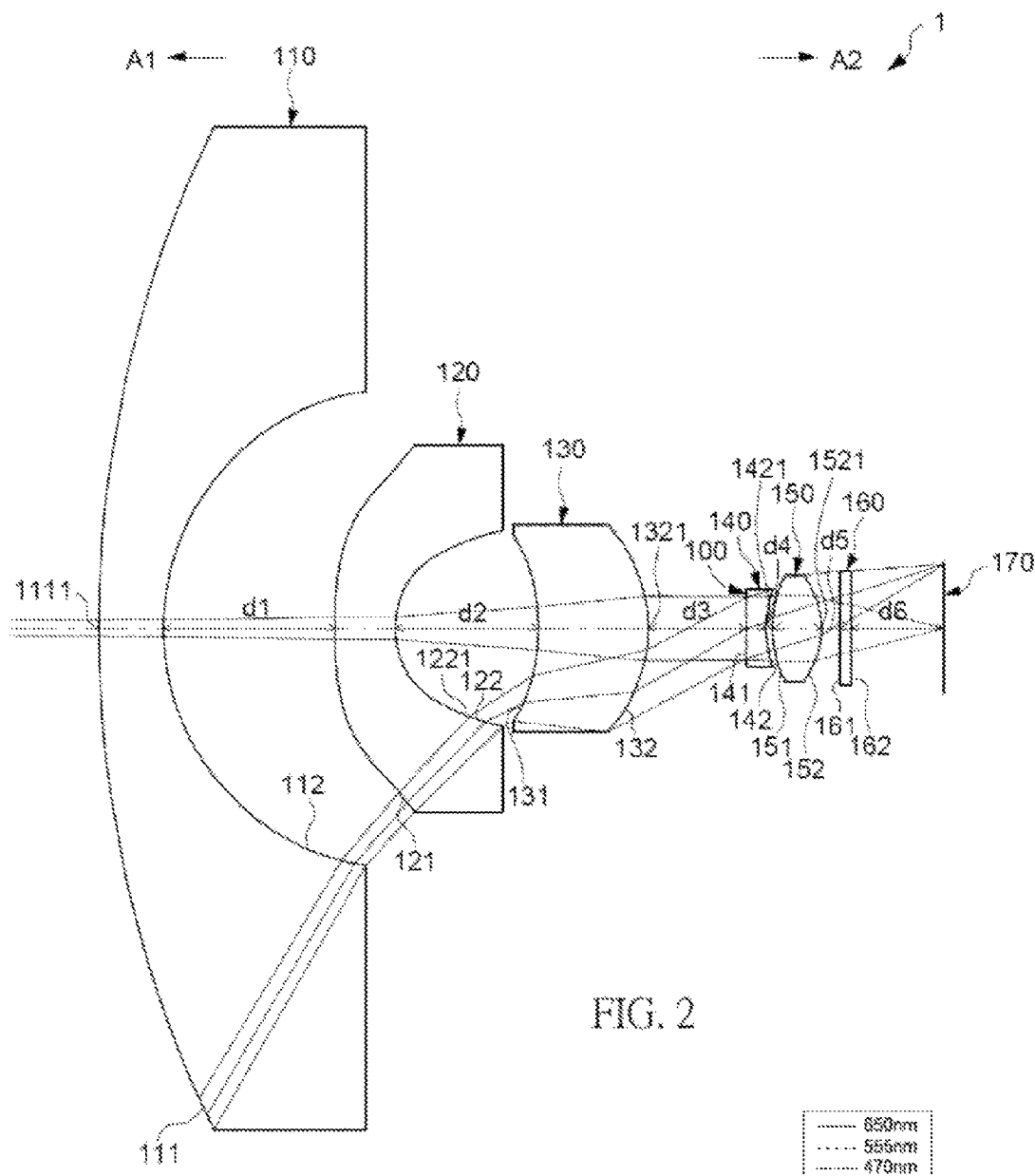
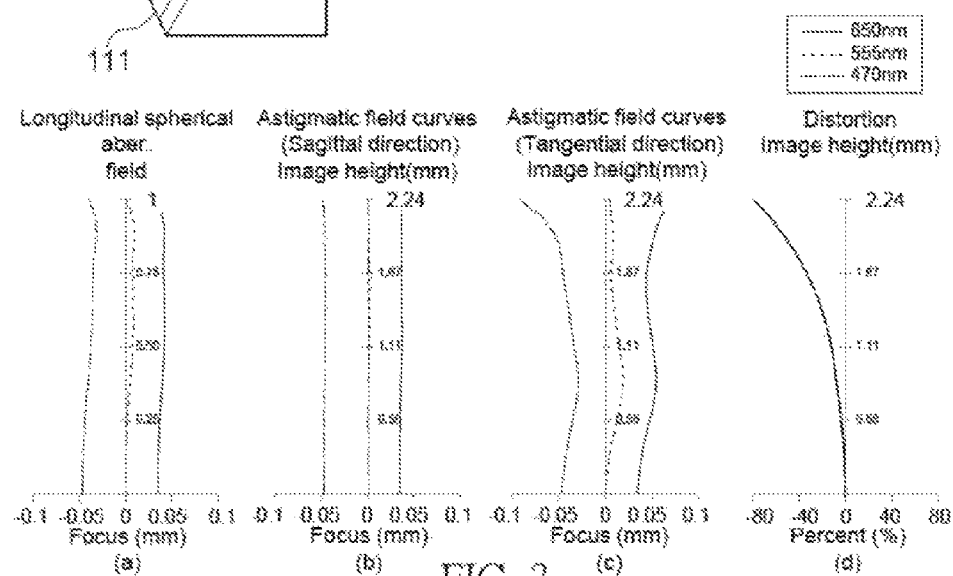
FIG. 3

| f(Focus)= 1.2173mm, HFOV(Half angular field of view)= 83.51 deg., System length=29.578mm, Fno=2.0, Image heigh=2.24mm ||||||||
|---|---|---|---|---|---|---|---|
| Surface # | | Radius | Thickness | Refractive index | Abbe number | Focus | Material |
| - | Object | ∞ | ∞ | | | | |
| 111 | 1st lens element | 39.4823 | 2.2808 | 1.517 | 64.141 | -20.9984 | glass |
| 112 | | 8.3470 | 6.0139 | | | | |
| 121 | 2nd lens element | 32.3328 | 2.0944 | 1.545 | 56.114 | -6.8716 | plastic |
| 122 | | 3.2790 | 5.0126 | | | | |
| 131 | 3rd lens element | -6.7737 | 3.8292 | 1.642 | 23.265 | 12.9983 | plastic |
| 132 | | -4.5648 | 3.4029 | | | | |
| 100 | Aperture stop | ∞ | -0.0003 | | | | |
| 141 | 4th lens element | 15.2220 | 0.7278 | 1.642 | 23.265 | -7.8164 | plastic |
| 142 | | 3.7030 | 0.2060 | | | | |
| 151 | 5th lens element | 3.5857 | 1.7222 | 1.545 | 56.114 | 3.0959 | plastic |
| 152 | | -2.6460 | 0.6538 | | | | |
| 161 | IR cut filter | ∞ | 0.4000 | | | | |
| 162 | | ∞ | 3.2349 | | | | |
| 170 | Image plane | ∞ | | | | | |

FIG. 4

| Aspherical parameters | | | | |
|---|---|---|---|---|
| Surface # | 121 | 122 | 131 | 132 |
| K | 8.16405E-02 | -3.80240E-01 | 2.21825E-02 | -4.17060E-03 |
| $a_4$ | 2.98592E-03 | 5.33894E-03 | -1.74828E-04 | 3.05210E-03 |
| $a_6$ | -5.28444E-05 | 2.22289E-04 | 2.60572E-04 | -2.20154E-04 |
| $a_8$ | 6.18812E-07 | 1.08427E-04 | -7.27135E-05 | 3.43699E-05 |
| $a_{10}$ | -4.32006E-09 | -1.59373E-05 | 9.31801E-06 | -4.75579E-06 |
| $a_{12}$ | -3.13296E-10 | 1.18125E-06 | -6.51159E-07 | 4.37981E-07 |
| $a_{14}$ | 5.20321E-12 | -3.73002E-08 | 1.65301E-08 | -2.19701E-08 |
| $a_{16}$ | | | | 4.70632E-10 |
| Surface # | 141 | 142 | 151 | 152 |
| K | 8.75781E-14 | 5.29376E-02 | -6.01250E+00 | 2.82594E-03 |
| $a_4$ | -6.11796E-03 | -5.05760E-03 | -5.73573E-03 | 7.55242E-03 |
| $a_6$ | -3.84201E-03 | 3.08616E-03 | 1.40794E-03 | -3.21461E-03 |
| $a_8$ | 2.40380E-03 | -1.29196E-02 | -2.43504E-03 | 4.86764E-03 |
| $a_{10}$ | -7.61767E-03 | 1.24013E-02 | 2.07601E-03 | -3.07694E-03 |
| $a_{12}$ | 9.87489E-03 | -6.74628E-03 | -8.61874E-04 | 1.14638E-03 |
| $a_{14}$ | -6.52348E-03 | 1.89201E-03 | 1.71824E-04 | -2.08722E-04 |
| $a_{16}$ | 1.71848E-03 | -2.08041E-04 | -1.31893E-05 | 1.45016E-05 |

FIG. 5

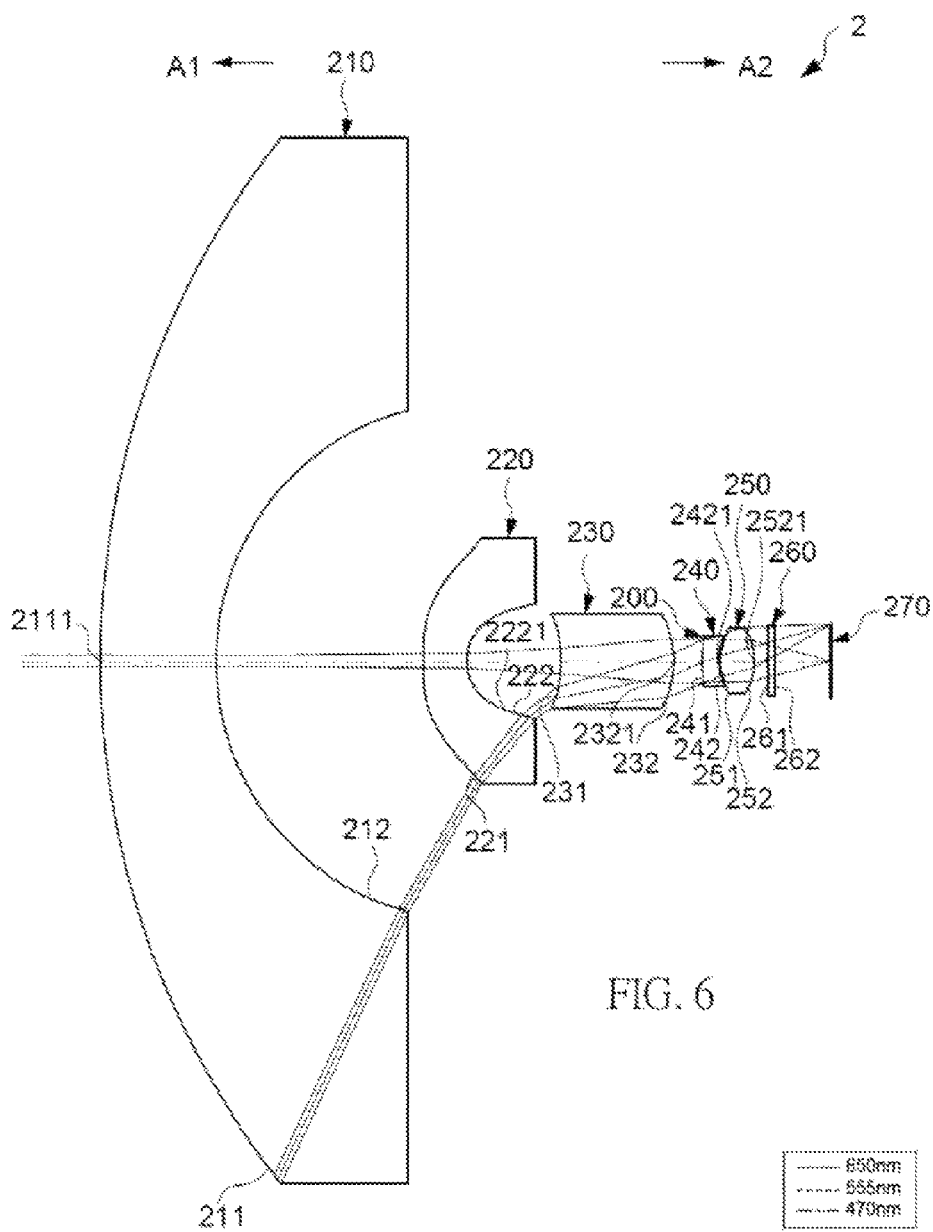
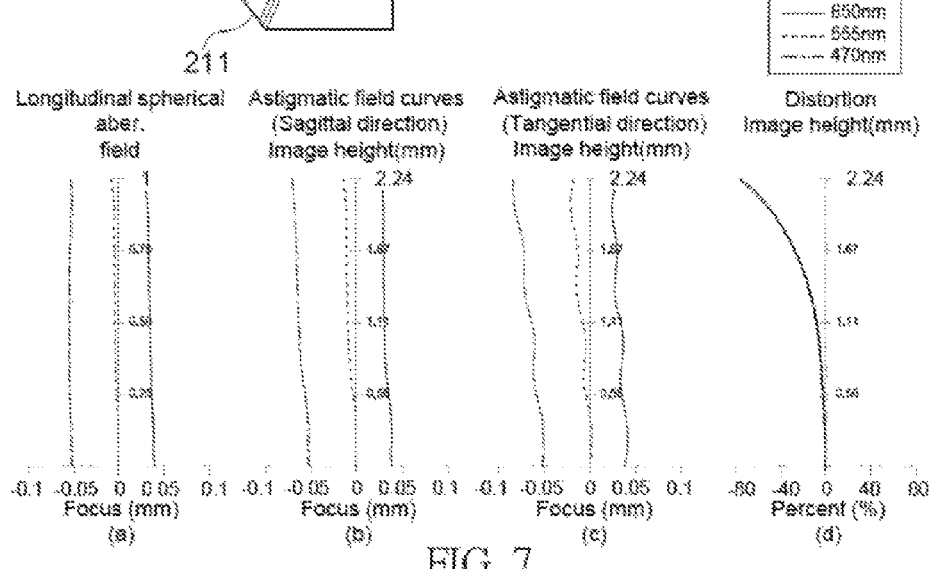
FIG. 7

| f(Focus)= 1.3982mm, HFOV(Half angular field of view)= 81.10deg., System length=45.071mm, Fno=2.0, Image heigh=2.24mm ||||||||
|---|---|---|---|---|---|---|---|
| Surface # | | Radius | Thickness | Refractive index | Abbe number | Focus | Material |
| -- | Object | ∞ | ∞ | | | | |
| 211 | 1st lens element | 51.6428 | 7.1194 | 1.517 | 64.141 | -47.4917 | glass |
| 212 | | 15.8590 | 12.7855 | | | | |
| 221 | 2nd lens element | 22.1016 | 2.8916 | 1.545 | 56.114 | -7.6181 | plastic |
| 222 | | 3.3446 | 5.7827 | | | | |
| 231 | 3rd lens element | -3.6362 | 6.0399 | 1.642 | 23.265 | 14.2433 | plastic |
| 232 | | -5.8364 | 1.8632 | | | | |
| 200 | Aperture stop | ∞ | -0.0901 | | | | |
| 241 | 4th lens element | 8.0295 | 0.9913 | 1.642 | 23.265 | -8.5924 | plastic |
| 242 | | 3.1118 | 0.1773 | | | | |
| 251 | 5th lens element | 3.4942 | 2.0760 | 1.545 | 56.114 | 3.5459 | plastic |
| 252 | | -3.4163 | 0.8211 | | | | |
| 261 | IR cut filter | ∞ | 0.4000 | | | | |
| 262 | | ∞ | 3.5131 | | | | |
| 270 | Image plane | ∞ | | | | | |

FIG. 8

| Aspherical parameters | | | | |
|---|---|---|---|---|
| Surface # | 221 | 222 | 231 | 232 |
| K | -1.64728E+01 | -5.99818E-01 | 1.10966E+00 | -9.50018E-02 |
| $a_4$ | 2.14283E-03 | 6.70265E-03 | 4.96759E-05 | 2.71463E-03 |
| $a_6$ | -2.64085E-05 | -9.80402E-05 | -1.19758E-04 | -3.21010E-04 |
| $a_8$ | 1.23971E-08 | 1.38917E-04 | 1.97932E-05 | 3.72413E-05 |
| $a_{10}$ | 1.42071E-09 | -1.21501E-05 | -2.61102E-06 | -3.30481E-06 |
| $a_{12}$ | -2.73518E-11 | 2.14369E-07 | 1.58348E-07 | 1.89399E-07 |
| $a_{14}$ | 2.42278E-13 | 2.10776E-08 | -4.01527E-08 | -5.70873E-09 |
| $a_{16}$ | | | | 6.41974E-11 |
| Surface # | 241 | 242 | 251 | 252 |
| K | 1.21203E+01 | -1.80756E-01 | -5.81689E-01 | 2.08003E-01 |
| $a_4$ | -3.42347E-03 | -3.20752E-03 | -4.08210E-03 | 1.54816E-03 |
| $a_6$ | -1.99470E-03 | -5.83179E-04 | -5.12613E-04 | -7.56696E-05 |
| $a_8$ | 2.63576E-04 | -2.27710E-03 | -7.06224E-04 | 2.87146E-04 |
| $a_{10}$ | -3.31563E-04 | 1.84569E-03 | 7.77482E-04 | -2.18914E-04 |
| $a_{12}$ | 1.51303E-04 | -6.70387E-04 | -2.66208E-04 | 8.01894E-05 |
| $a_{14}$ | -3.39939E-05 | 1.10384E-04 | 3.94673E-05 | -1.19524E-05 |
| $a_{16}$ | 2.64982E-06 | -6.66009E-06 | -2.12184E-06 | 6.21972E-07 |

FIG. 9

| \multicolumn{8}{c}{f(Focus)= 1.3660mm, HFOV(Half angular field of view)= 79.64deg., System length=45.114mm, Fno=2.0, Image height=2.24mm} |||||||
|---|---|---|---|---|---|---|---|
| Surface # | | Radius | Thickness | Refractive index | Abbe number | Focus | Material |
| - | Object | ∞ | ∞ | | | | |
| 311 | 1st lens element | 43.6436 | 13.9688 | 1.517 | 64.141 | -27.9532 | glass |
| 312 | | 9.6723 | 7.9359 | | | | |
| 321 | 2nd lens element | 48.2176 | 3.0740 | 1.545 | 56.114 | -7.4644 | plastic |
| 322 | | 3.6668 | 5.4593 | | | | |
| 331 | 3rd lens element | -7.7332 | 5.3942 | 1.642 | 23.265 | 13.4607 | plastic |
| 332 | | -5.1937 | 1.4522 | | | | |
| 300 | Aperture stop | ∞ | -0.0144 | | | | |
| 341 | 4th lens element | 16.7101 | 0.9960 | 1.642 | 23.265 | -8.6566 | plastic |
| 342 | | 4.0729 | 0.1533 | | | | |
| 351 | 5th lens element | 4.0659 | 1.9754 | 1.545 | 56.114 | 3.4912 | plastic |
| 352 | | -2.9624 | 0.7317 | | | | |
| 361 | IR cut filter | ∞ | 0.4000 | | | | |
| 362 | | ∞ | 3.5871 | | | | |
| 370 | Image plane | ∞ | | | | | |

FIG. 12

| Aspherical parameters | | | | |
|---|---|---|---|---|
| Surface # | 321 | 322 | 331 | 332 |
| K | -4.82110E-07 | -1.28977E-01 | 5.09110E-01 | -3.91247E-02 |
| $a_4$ | 2.40317E-03 | 4.99379E-03 | 1.38783E-04 | 3.35485E-03 |
| $a_6$ | -2.85859E-05 | 1.30809E-04 | -1.84125E-04 | -2.90594E-04 |
| $a_8$ | -2.31387E-08 | 1.82067E-04 | 3.76947E-05 | 7.42593E-06 |
| $a_{10}$ | 3.48632E-09 | -3.01432E-05 | -3.75907E-06 | 2.48088E-06 |
| $a_{12}$ | -9.17689E-11 | 1.92417E-06 | 1.68555E-07 | -3.31714E-07 |
| $a_{14}$ | 7.49680E-13 | -4.33206E-08 | -5.14302E-09 | 1.76195E-08 |
| $a_{16}$ | | | | -3.51045E-10 |
| Surface # | 341 | 342 | 351 | 352 |
| K | -7.05500E-06 | -2.53161E-02 | -9.07033E-02 | -4.46112E-03 |
| $a_4$ | -3.60836E-03 | -5.04668E-03 | -4.41979E-03 | 5.07603E-03 |
| $a_6$ | -2.41399E-03 | 2.93795E-03 | 1.68865E-03 | -2.19265E-03 |
| $a_8$ | 1.17494E-03 | -7.03784E-03 | -2.30142E-03 | 2.48311E-03 |
| $a_{10}$ | -1.64806E-03 | 5.30221E-03 | 1.55792E-03 | -1.26453E-03 |
| $a_{12}$ | 9.63864E-04 | -2.05727E-03 | -5.01663E-04 | 3.69262E-04 |
| $a_{14}$ | -2.68843E-04 | 3.85870E-04 | 7.57774E-05 | -5.19910E-05 |
| $a_{16}$ | 2.74669E-05 | -2.76281E-05 | -4.34317E-06 | 2.77833E-06 |

FIG. 13

| f(Focus)= 1.3169mm, HPOV(Half angular field of view)= 82.86deg., System length=30.154mm, Fno=2.0, Image heigh=2.24mm ||||||||
|---|---|---|---|---|---|---|---|
| Surface # | | Radius | Thickness | Refractive index | Abbe number | Focus | Material |
| - | Object | ∞ | ∞ | | | | |
| 411 | 1st lens element | 38.1703 | 1.6000 | 1.517 | 64.141 | -15.0682 | glass |
| 412 | | 6.3772 | 3.9823 | | | | |
| 421 | 2nd lens element | 200.8808 | 1.5965 | 1.545 | 56.114 | -7.1857 | plastic |
| 422 | | 3.8309 | 6.0504 | | | | |
| 431 | 3rd lens element | -7.4448 | 3.4273 | 1.642 | 23.265 | 15.7378 | plastic |
| 432 | | -4.9881 | 4.0419 | | | | |
| 400 | Aperture stop | ∞ | -0.0315 | | | | |
| 441 | 4th lens element | 14.5050 | 1.5277 | 1.642 | 23.265 | -7.4642 | plastic |
| 442 | | 3.4533 | 0.1000 | | | | |
| 451 | 5th lens element | 3.2031 | 2.6283 | 1.545 | 56.114 | 3.3725 | plastic |
| 452 | | -3.0632 | 0.7276 | | | | |
| 461 | IR cut filter | ∞ | 0.4000 | | | | |
| 462 | | ∞ | 3.7039 | | | | |
| 470 | Image plane | ∞ | | | | | |

FIG. 16

| Aspherical parameters | | | | |
|---|---|---|---|---|
| Surface # | 421 | 422 | 431 | 432 |
| K | -1.64120E-06 | -4.62029E-01 | -4.52768E-01 | 1.53307E-02 |
| $a_4$ | 2.42537E-03 | 3.01523E-03 | -9.83317E-05 | 1.61132E-03 |
| $a_6$ | -7.36840E-05 | 3.07258E-04 | 8.95623E-05 | -7.04471E-05 |
| $a_8$ | -5.06973E-06 | 3.34031E-05 | -1.45735E-05 | 1.38759E-05 |
| $a_{10}$ | 2.49365E-07 | -1.41640E-05 | 2.20739E-06 | -1.89837E-06 |
| $a_{12}$ | -4.88686E-09 | 1.33615E-06 | -2.03108E-07 | 1.47189E-07 |
| $a_{14}$ | 3.42661E-11 | -3.87369E-08 | 6.15809E-09 | -6.12278E-09 |
| $a_{16}$ | | | | 1.12385E-10 |
| Surface # | 441 | 442 | 451 | 452 |
| K | 2.32751E-06 | 3.28440E-01 | -1.71401E-01 | -9.43479E-03 |
| $a_4$ | -2.72996E-03 | -4.15980E-03 | -5.08724E-03 | 5.87571E-03 |
| $a_6$ | 8.20510E-04 | -6.55076E-04 | 1.46022E-03 | -5.66548E-04 |
| $a_8$ | -4.18210E-03 | 9.58923E-04 | -1.50271E-03 | 6.95957E-04 |
| $a_{10}$ | 5.78640E-03 | -2.39633E-03 | 5.10933E-04 | -2.09799E-04 |
| $a_{12}$ | -4.65074E-03 | 1.65439E-03 | 6.31716E-06 | 2.08025E-05 |
| $a_{14}$ | 1.92895E-03 | -4.81366E-04 | -3.02701E-05 | 5.37378E-06 |
| $a_{16}$ | -3.18968E-04 | 5.04520E-05 | 3.80137E-06 | -8.24896E-07 |

FIG. 17

| f(Focus)= 1.6493mm, HPOV(Half angular field of view)= 77.59deg., System length=28.982mm, Fno=2.0, Image height=2.24mm ||||||||
|---|---|---|---|---|---|---|---|
| Surface # | | Radius | Thickness | Refractive index | Abbe number | Focus | Material |
| - | Object | ∞ | ∞ | | | | |
| 511 | 1st lens element | 13.3022 | 1.1612 | 1.517 | 64.141 | -23.2972 | glass |
| 512 | | 6.1329 | 4.6035 | | | | |
| 521 | 2nd lens element | -71.2740 | 0.6460 | 1.545 | 56.114 | -8.3549 | plastic |
| 522 | | 4.8788 | 2.6989 | | | | |
| 531 | 3rd lens element | -7.4262 | 10.0079 | 1.642 | 23.265 | 5.4024 | plastic |
| 532 | | -3.6094 | 1.4307 | | | | |
| 500 | Aperture stop | ∞ | 0.0826 | | | | |
| 541 | 4th lens element | -75.4314 | 0.3892 | 1.642 | 23.265 | -4.5662 | plastic |
| 542 | | 3.0545 | 0.1001 | | | | |
| 551 | 5th lens element | 3.0318 | 3.2878 | 1.545 | 56.114 | 3.7204 | plastic |
| 552 | | -3.7782 | 0.8339 | | | | |
| 561 | IR cut filter | ∞ | 0.4000 | | | | |
| 562 | | ∞ | 3.4171 | | | | |
| 570 | Image plane | ∞ | | | | | |

FIG. 20

| Aspherical parameters | | | | |
|---|---|---|---|---|
| Surface # | 521 | 522 | 531 | 532 |
| K | 1.07125E-06 | 1.74389E-01 | 1.69205E+00 | -6.87579E-01 |
| $a_4$ | 1.23101E-02 | 1.44792E-02 | -1.53732E-06 | 8.02928E-03 |
| $a_6$ | -1.31117E-03 | -1.75586E-04 | -3.02455E-04 | -1.21143E-03 |
| $a_8$ | 7.01338E-05 | -2.14378E-04 | 5.61852E-05 | 2.01532E-04 |
| $a_{10}$ | -1.88126E-06 | 2.04983E-05 | -7.19866E-06 | -2.55298E-05 |
| $a_{12}$ | 1.95297E-08 | -3.95221E-07 | 4.70871E-07 | 2.09205E-06 |
| $a_{14}$ | 4.11574E-11 | -6.29070E-09 | -1.13008E-08 | -9.36535E-08 |
| $a_{16}$ | | | | 1.72821E-09 |
| Surface # | 541 | 542 | 551 | 552 |
| K | -8.43384E-04 | -3.13621E-01 | -6.33907E-03 | -5.12429E-01 |
| $a_4$ | 2.02815E-02 | 1.79556E-02 | 5.79968E-03 | 4.49555E-03 |
| $a_6$ | -2.33894E-02 | -4.09210E-02 | -1.77269E-02 | -1.38982E-03 |
| $a_8$ | 1.25279E-02 | 3.27315E-02 | 1.66374E-02 | 1.82119E-03 |
| $a_{10}$ | -2.79589E-03 | -1.43276E-02 | -7.81869E-03 | -9.31474E-04 |
| $a_{12}$ | -4.61623E-04 | 3.29287E-03 | 1.92237E-03 | 2.59774E-04 |
| $a_{14}$ | 3.26024E-04 | -3.59186E-04 | -2.36121E-04 | -3.31008E-05 |
| $a_{16}$ | -4.12119E-05 | 1.33178E-05 | 1.14223E-05 | 1.53571E-06 |

FIG. 21

| f(Focus)= 2.3126mm, HFOV(Half angular field of view)= 60.31deg., System length=15.535mm, Fno=2.0, Image height=2.23mm |||||||||
|---|---|---|---|---|---|---|---|
| Surface # | | Radius | Thickness | Refractive index | Abbe number | Focus | Material |
| - | Object | ∞ | ∞ | | | | |
| 611 | 1st lens element | 150.0000 | 0.4500 | 1.517 | 64.141 | -9.5971 | glass |
| 612 | | 4.7977 | 0.8589 | | | | |
| 621 | 2nd lens element | 22.8663 | 0.3000 | 1.545 | 56.114 | -9.5841 | plastic |
| 622 | | 4.2317 | 2.0121 | | | | |
| 631 | 3rd lens element | -5.1050 | 1.6062 | 1.642 | 23.265 | 12.4879 | plastic |
| 632 | | -3.5335 | 2.7181 | | | | |
| 680 | Aperture stop | ∞ | 0.0142 | | | | |
| 641 | 4th lens element | 17.5093 | 0.7921 | 1.642 | 23.265 | -8.6635 | plastic |
| 642 | | 4.1460 | 0.2751 | | | | |
| 651 | 5th lens element | 4.2666 | 1.2792 | 1.545 | 56.114 | 3.1851 | plastic |
| 652 | | -2.6163 | 0.6832 | | | | |
| 661 | IR cut filter | ∞ | 0.4000 | | | | |
| 662 | | ∞ | 4.1361 | | | | |
| 670 | Image plane | ∞ | | | | | |

FIG. 24

| Aspherical parameters | | | | |
|---|---|---|---|---|
| Surface # | 621 | 622 | 631 | 632 |
| K | 4.20610E+00 | -5.88636E-01 | 1.04359E+00 | -1.82196E-01 |
| $a_4$ | 5.24530E-03 | 7.41757E-03 | -2.97610E-03 | 2.62346E-03 |
| $a_6$ | 3.28842E-04 | 7.75917E-04 | 1.26622E-03 | 4.19330E-04 |
| $a_8$ | -1.35893E-04 | 7.89489E-06 | -2.10461E-04 | -1.26004E-04 |
| $a_{10}$ | 1.17428E-05 | -2.23968E-05 | 1.09439E-05 | 1.46610E-05 |
| $a_{12}$ | -4.12488E-07 | 1.94545E-06 | 1.76697E-08 | -8.55467E-07 |
| $a_{14}$ | 5.23043E-08 | -5.29893E-08 | -9.73926E-08 | 3.41444E-08 |
| $a_{16}$ | | | | -9.97453E-10 |
| Surface # | 641 | 642 | 651 | 652 |
| K | -8.58536E-07 | -9.41510E-02 | -4.49129E-01 | -3.49080E-03 |
| $a_4$ | -4.82204E-03 | -2.34089E-03 | -6.44460E-03 | 3.32015E-03 |
| $a_6$ | 4.41059E-03 | 2.51016E-03 | 9.27205E-04 | 7.16930E-05 |
| $a_8$ | -1.79825E-02 | -1.43790E-02 | -2.09477E-03 | 9.25483E-04 |
| $a_{10}$ | 1.71807E-02 | 1.50409E-02 | 2.07859E-03 | -7.86063E-04 |
| $a_{12}$ | -8.02254E-03 | -8.03733E-03 | -8.43474E-04 | 4.19065E-04 |
| $a_{14}$ | 1.42354E-03 | 2.08652E-03 | 1.53540E-04 | -8.88697E-05 |
| $a_{16}$ | 4.39463E-06 | -2.10464E-04 | -1.05846E-05 | 6.49807E-06 |

FIG. 25

| f(Focus)= 1.6867mm, HFOV(Half angular field of view)= 77.72deg., System length=29.003mm, Fno=2.0, Image heigh=2.24mm ||||||||
|---|---|---|---|---|---|---|---|
| Surface # | | Radius | Thickness | Refractive index | Abbe number | Focus | Material |
| -- | Object | ∞ | ∞ | | | | |
| 711 | 1st lens element | 29.9566 | 1.4000 | 1.517 | 64.141 | -14.3681 | glass |
| 712 | | 5.8573 | 4.1359 | | | | |
| 721 | 2nd lens element | -25.8930 | 1.0828 | 1.535 | 56.273 | -8.5879 | plastic |
| 722 | | 5.6718 | 5.6980 | | | | |
| 731 | 3rd lens element | -7.4927 | 2.0000 | 1.609 | 26.651 | 18.7069 | plastic |
| 732 | | -4.9758 | 6.6652 | | | | |
| 700 | Aperture stop | ∞ | -0.0024 | | | | |
| 741 | 4th lens element | 15.3635 | 0.4738 | 1.609 | 26.651 | -6.6491 | plastic |
| 742 | | 3.1675 | 0.1000 | | | | |
| 751 | 5th lens element | 3.0296 | 1.4733 | 1.535 | 56.273 | 3.2454 | plastic |
| 752 | | -3.3831 | 0.7493 | | | | |
| 761 | IR cut filter | ∞ | 0.4000 | | | | |
| 762 | | ∞ | 4.8267 | | | | |
| 770 | Image plane | ∞ | | | | | |

FIG. 28

| Aspherical parameters | | | | |
|---|---|---|---|---|
| Surface # | 721 | 722 | 731 | 732 |
| K | -1.38198E-01 | -1.15497E+00 | -4.42542E-01 | 5.83986E-03 |
| $a_4$ | 4.63418E-03 | 6.96356E-03 | -1.41064E-04 | 1.13743E-03 |
| $a_6$ | -1.58622E-04 | 1.40009E-05 | 1.45467E-04 | 3.87185E-05 |
| $a_8$ | 2.23836E-06 | 2.94826E-05 | -1.34780E-05 | 9.46122E-07 |
| $a_{10}$ | -5.96839E-08 | -3.14109E-06 | -3.14407E-08 | -9.27295E-07 |
| $a_{12}$ | 1.88733E-08 | -1.07329E-08 | 2.49065E-08 | 8.76288E-08 |
| $a_{14}$ | -1.99392E-11 | 4.73915E-09 | -4.10450E-10 | -3.40605E-09 |
| $a_{16}$ | | | | 5.30403E-11 |
| Surface # | 741 | 742 | 751 | 752 |
| K | 2.80295E-03 | -1.89498E-01 | -4.88578E-01 | 1.78106E-01 |
| $a_4$ | 2.87367E-03 | 2.31908E-02 | 1.35094E-02 | -1.23570E-03 |
| $a_6$ | -9.59806E-03 | -2.43090E-02 | -1.56391E-02 | 8.68005E-04 |
| $a_8$ | 2.56046E-03 | 5.13460E-03 | 3.93100E-03 | -8.94137E-04 |
| $a_{10}$ | -8.55436E-04 | 5.12623E-04 | -2.77402E-05 | 7.89312E-04 |
| $a_{12}$ | 3.84025E-04 | -4.04135E-04 | -1.71555E-04 | -3.57669E-04 |
| $a_{14}$ | -1.17651E-04 | 4.52392E-05 | 3.45330E-05 | 8.61425E-05 |
| $a_{16}$ | 1.33113E-05 | 1.08370E-07 | -2.37316E-06 | -7.55630E-06 |

FIG. 29

| \multicolumn{7}{|c|}{f(Focus)= 1.6770mm, HFOV(Half angular field of view)= 76.60deg., System length=29.002mm, Fno=2.0, Image height=2.24mm} |
|---|---|---|---|---|---|---|
| Surface # | | Radius | Thickness | Refractive index | Abbe number | Focus | Material |
| - | Object | ∞ | ∞ | | | | |
| 811 | 1st lens element | 26.4684 | 1.4278 | 1.517 | 64.141 | -15.1108 | glass |
| 812 | | 5.9209 | 4.5822 | | | | |
| 821 | 2nd lens element | -23.1298 | 1.7100 | 1.535 | 56.273 | -8.0564 | plastic |
| 822 | | 5.4384 | 5.1902 | | | | |
| 831 | 3rd lens element | -7.1846 | 2.0000 | 1.638 | 23.901 | 17.5724 | plastic |
| 832 | | -4.8519 | 6.2245 | | | | |
| 800 | Aperture stop | ∞ | 0.0023 | | | | |
| 841 | 4th lens element | 14.6987 | 0.4069 | 1.638 | 23.901 | -6.2847 | plastic |
| 842 | | 3.1146 | 0.1000 | | | | |
| 851 | 5th lens element | 2.9669 | 1.4025 | 1.535 | 56.273 | 3.1574 | plastic |
| 852 | | -3.2812 | 0.7136 | | | | |
| 861 | IR cut filter | ∞ | 0.4000 | | | | |
| 862 | | ∞ | 4.8419 | | | | |
| 870 | Image plane | ∞ | | | | | |

FIG. 32

| Aspherical parameters | | | | |
|---|---|---|---|---|
| Surface # | 821 | 822 | 831 | 832 |
| K | -1.38195E-01 | -1.55276E+00 | -5.52003E-01 | 1.23720E-02 |
| $a_4$ | 3.58357E-03 | 6.64654E-03 | -1.31604E-04 | 1.25468E-03 |
| $a_6$ | -1.22067E-04 | 8.15896E-05 | 2.17781E-04 | 8.02134E-05 |
| $a_8$ | 2.82151E-06 | 1.68567E-05 | -2.47632E-05 | -4.33256E-06 |
| $a_{10}$ | -1.01173E-07 | -2.18641E-07 | 3.21255E-07 | -9.77506E-07 |
| $a_{12}$ | 2.38663E-09 | -3.06478E-07 | 3.03555E-08 | 1.30484E-07 |
| $a_{14}$ | -2.01893E-11 | 1.47181E-08 | -4.99538E-10 | -6.03727E-09 |
| $a_{16}$ | 0.00000E+00 | 0.00000E+00 | 0.00000E+00 | 1.07179E-10 |
| Surface # | 841 | 842 | 851 | 852 |
| K | 2.80296E-03 | -2.01112E-01 | -4.65745E-01 | 1.84752E-01 |
| $a_4$ | 4.11267E-03 | 2.80722E-02 | 1.49641E-02 | -1.64428E-03 |
| $a_6$ | -1.15964E-02 | -3.03006E-02 | -1.93327E-02 | 1.42183E-03 |
| $a_8$ | 1.49988E-03 | 6.41451E-03 | 5.16084E-03 | -1.64848E-03 |
| $a_{10}$ | 6.66559E-04 | 1.48916E-03 | 2.22234E-04 | 1.49841E-03 |
| $a_{12}$ | -2.41577E-04 | -1.00117E-03 | -4.04957E-04 | -7.11448E-04 |
| $a_{14}$ | -2.37992E-05 | 1.53841E-04 | 8.84874E-05 | 1.80793E-04 |
| $a_{16}$ | 1.10644E-05 | -5.76874E-06 | -6.89569E-06 | -1.71336E-05 |

FIG. 33

| f(Focus)= 1.6770mm, HFOV(Half angular field of view)= 83.64deg., System length=20.613mm, Fno=2.0, Image height=2.24mm |||||||
|---|---|---|---|---|---|---|---|
| Surface # | | Radius | Thickness | Refractive index | Abbe number | Focus | Material |
| -- | Object | ∞ | ∞ | | | | |
| 911 | 1st lens element | 22.6804 | 1.5725 | 1.774 | 49.624 | -9.3886497 | glass |
| 912 | | 5.3338 | 3.5295 | | | | |
| 921 | 2nd lens element | -24.5187 | 1.2000 | 1.545 | 56.114 | -4.0176031 | plastic |
| 922 | | 2.4453 | 2.1244 | | | | |
| 931 | 3rd lens element | 10.7420 | 3.5685 | 1.642 | 23.265 | 5.56076457 | plastic |
| 932 | | -4.6516 | 1.6591 | | | | |
| 900 | Aperture stop | ∞ | 0.1588 | | | | |
| 941 | 4th lens element | -6.5743 | 0.7649 | 1.642 | 23.265 | -8.32156 | plastic |
| 942 | | 29.7860 | 0.2050 | | | | |
| 951 | 5th lens element | 5.8859 | 1.6945 | 1.545 | 56.114 | 3.3016371 | plastic |
| 952 | | -2.3279 | 0.6000 | | | | |
| 961 | IR cut filter | ∞ | 0.4000 | | | | |
| 962 | | ∞ | 3.1361 | | | | |
| 970 | Image plane | ∞ | | | | | |

FIG. 36

| Aspherical parameters | | | | |
|---|---|---|---|---|
| Surface # | 921 | 922 | 931 | 932 |
| K | 0 | -1 | 0 | 0 |
| $a_4$ | 2.65033E-03 | -3.66419E-03 | -6.36508E-03 | 2.23469E-03 |
| $a_6$ | -7.54810E-05 | 1.94701E-03 | 5.03903E-04 | 2.11090E-05 |
| $a_8$ | 8.48219E-08 | -4.13575E-04 | -1.64776E-06 | -8.18910E-08 |
| $a_{10}$ | | 1.12082E-04 | -1.79865E-08 | -1.14319E-07 |
| $a_{12}$ | | -2.15623E-05 | | -2.33070E-11 |
| $a_{14}$ | | 2.74366E-06 | | 1.01056E-12 |
| $a_{16}$ | | -1.98603E-07 | | |
| $a_{18}$ | | 6.13793E-08 | | |
| $a_{20}$ | | | | |
| Surface # | 941 | 942 | 951 | 952 |
| K | 0 | 0 | 0 | 0 |
| $a_4$ | 1.59493E-02 | 2.55347E-02 | -2.20199E-04 | 8.63707E-03 |
| $a_6$ | -4.49630E-03 | -3.45407E-04 | 1.72807E-03 | -6.09787E-04 |
| $a_8$ | -1.27616E-03 | -1.79708E-03 | -4.68488E-04 | 4.54930E-04 |
| $a_{10}$ | 6.79710E-05 | 2.97201E-05 | 6.52595E-06 | 1.55765E-04 |
| $a_{12}$ | 3.18429E-05 | | 1.37570E-05 | -8.57085E-05 |
| $a_{14}$ | | | | 3.03191E-05 |
| $a_{16}$ | | | | -6.48135E-06 |
| $a_{18}$ | | | | 7.67017E-07 |
| $a_{20}$ | | | | -3.85741E-08 |

FIG. 37

| Embodiment | 1st Embodiment | 2nd Embodiment | 3rd Embodiment | 4th Embodiment | 5th Embodiment | 6th Embodiment | 7th Embodiment | 8th Embodiment | 9th Embodiment |
|---|---|---|---|---|---|---|---|---|---|
| ALT/T4 | 14.639 | 19.992 | 25.599 | 7.318 | 49.841 | 5.590 | 13.571 | 17.072 | 9.700 |
| f3/f1 | 10.678 | 10.187 | 9.854 | 11.571 | 3.276 | 5.400 | 11.091 | 10.478 | 4.141 |
| AAG/T5 | 8.498 | 9.884 | 7.587 | 5.381 | 2.713 | 4.595 | 11.265 | 11.479 | 4.437 |
| T3/T5 | 2.223 | 3.343 | 2.731 | 1.304 | 3.044 | 1.256 | 1.358 | 1.426 | 2.106 |
| f1/f1+f2/f1 | 22.895 | 39.414 | 25.928 | 16.898 | 19.192 | 8.294 | 13.610 | 13.815 | 9.983 |
| T1/T5 | 1.324 | 3.429 | 7.071 | 0.609 | 0.353 | 0.352 | 0.950 | 1.018 | 0.928 |
| AG34/T5 | 1.976 | 0.897 | 0.735 | 1.538 | 0.435 | 2.125 | 4.524 | 4.438 | 0.979 |
| ALT/AG34 | 3.131 | 10.637 | 17.496 | 2.766 | 10.772 | 1.629 | 0.965 | 1.116 | 5.400 |
| BFL/T4 | 5.893 | 4.776 | 4.738 | 3.163 | 15.041 | 6.682 | 12.613 | 14.635 | 4.478 |
| AG34/T4 | 4.676 | 1.880 | 1.458 | 2.646 | 4.627 | 3.432 | 14.068 | 15.296 | 1.796 |
| TTL/EFL | 24.299 | 32.234 | 33.025 | 22.898 | 17.573 | 6.718 | 17.194 | 17.204 | 15.350 |
| AG34/T2 | 1.625 | 0.692 | 0.472 | 2.024 | 2.215 | 9.060 | 6.156 | 3.640 | 1.383 |
| V1-V2 | 8.027 | 8.027 | 8.027 | 8.027 | 8.027 | 8.027 | 7.868 | 7.868 | -6.490 |
| V2-V3 | 32.848 | 32.848 | 32.848 | 32.848 | 32.848 | 32.848 | 29.621 | 32.372 | 32.848 |
| V1-V3 | 40.876 | 40.876 | 40.876 | 40.876 | 40.876 | 40.876 | 37.490 | 40.240 | 26.358 |

FIG. 38

CAMERA DEVICE AND OPTICAL IMAGING LENS THEREOF

INCORPORATION BY REFERENCE

This application claims priority from Taiwan Patent Application No. 102146952, filed on Dec. 18, 2013, the contents of which are hereby incorporated by reference in their entirety for all purposes.

TECHNICAL FIELD

The present invention relates to a camera device and an optical imaging lens thereof, and particularly, relates to a camera device applying an optical imaging lens having five lens elements and an optical imaging lens thereof.

BACKGROUND

Recently, small sized photography modules are applied in the devices not just cell phones, but gaming machines, such as video game consoles, handhold game console, etc., event data recorders, reversing camera systems mounted on motor vehicles, etc. However, for achieving better imaging quality for simulating the scenes in the game or presenting the details in the recorded frames better, these devices requires for a wide shot angle, which comes to one of the chief development goal of the optical imaging lens installed therein.

U.S. Patent Publication No. 2012/0257287, 2012/0307382, 2013/0176631 and 2013/0182335 all disclosed an optical imaging lens constructed with an optical imaging lens having five lens elements which is capable to provide only 30~35 degrees of shot angle. Current market demands express a preference for a wider shot angle. Therefore, there is needed to develop optical imaging lens which is capable to place with five lens elements therein, with a wide shot angle, while also having good optical characters.

SUMMARY

An object of the present invention is to provide a camera device and an optical imaging lens thereof. With controlling the convex or concave shape of the surfaces, the shot angle of the optical imaging lens is broadened and meanwhile the good optical characters are sustained.

In an exemplary embodiment, an optical imaging lens comprises, sequentially from an object side to an image side along an optical axis, comprises first, second, third, fourth and fifth lens elements, each of the first, second, third, fourth and fifth lens elements having refracting power, an object-side surface facing toward the object side and an image-side surface facing toward the image side, wherein: the object-side surface of the first lens element comprises a convex portion in a vicinity of the optical axis; the image-side surface of the second lens element comprises a concave portion in a vicinity of a periphery of the second lens element; the image-side surface of the third lens element comprises a convex portion in a vicinity of the optical axis; the image-side surface of the fourth lens element comprises a concave portion in a vicinity of the optical axis; and the image-side surface of the fifth lens element comprises a convex portion in a vicinity of the optical axis.

In another exemplary embodiment, other equation(s), such as those relating to the ratio among parameters could be taken into consideration. For example, the sum of the thickness of all five lens elements along the optical axis, ALT, and a central thickness of the fourth lens element along the optical axis, T4, could be controlled to satisfy the equation as follows:

$5.5 \leq ALT/T4$        Equation (1); or

A focal length of the third lens element, f3, and a focal length of the optical imaging lens, for EFL, could be controlled to satisfy the equation as follows:

$1.0 \leq |f3/f|$        Equation (2); or

A central thickness of the fifth lens element along the optical axis, T5, and the sum of all four air gaps from the first lens element to the fifth lens element along the optical axis, AAG, could be controlled to satisfy the equation as follows:

$4.4 \leq AAG/T5$        Equation (3); or

T5 and a central thickness of the third lens element along the optical axis, T3, could be controlled to satisfy the equation as follows:

$1.0 \leq T3/T5$        Equation (4); or f, a focal length of the first lens element, f1, and a focal length of the second lens element, f2, could be controlled to satisfy the equation as follows:

$7.5 \leq |f1/f| + |f2/f|$        Equation (5); or

T5 and a central thickness of the first lens element along the optical axis, T1, could be controlled to satisfy the equation as follows:

$0.8 \leq T1/T5$        Equation (6); or

T5 and an air gap between the third lens element and the fourth lens element along the optical axis, AG34, could be controlled to satisfy the equation as follows:

$0.4 \leq AG34/T5$        Equation (7); or

AG34 and ALT could be controlled to satisfy the equation as follows:

$ALT/AG34 \leq 12.0$        Equation (8); or

T4 and a back focal length of the optical imaging lens, i.e. the distance from the image-side surface of the fifth lens element to an image plane on the optical axis, BFL, could be controlled to satisfy the equation as follows:

$4.1 \leq BFL/T4$        Equation (9); or

T4 and AG34 could be controlled to satisfy the equation as follows:

$1.8 \leq AG34/T4$        Equation (10); or f and the distance from the object-side surface of the first lens element to an image plane, TTL, could be controlled to satisfy the equation as follows:

$3.5 \leq TTL/f$        Equation (11); or

AG34 and a central thickness of the second lens element along the optical axis, T2, could be controlled to satisfy the equation as follows:

$0.6 \leq AG34/T2$        Equation (12); or

An abbe number of the first lens element, V1, and an abbe number of the second lens element, V2, could be controlled to satisfy the equation as follows:

$V1 - V2 \leq 20.0$        Equation (13); or

V2 and an abbe number of the third lens element, V3, could be controlled to satisfy the equation as follows:

$0.0 \leq V2-V3$  Equation (14); or

V1 and V3 could be controlled to satisfy the equation as follows:

$20.0 \leq V1-V3$  Equation (15).

Aforesaid exemplary embodiments are not limited and could be selectively incorporated in other embodiments described herein.

In some exemplary embodiments, more details about the convex or concave surface structure, refracting power and/or the position of an aperture stop could be incorporated for one specific lens element or broadly for plural lens elements to enhance the control for the system performance and/or resolution, such as forming the object-side surface of the third lens element as a concave surface, etc. It is noted that the details listed here could be incorporated in example embodiments if no inconsistency occurs.

In another exemplary embodiment, a camera device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the camera device and the optical imaging lens thereof in exemplary embodiments achieve good optical characters and effectively broaden the shot angle of the optical imaging lens.

BRIEF DESCRIPTION OF THE DRAWINGS

Exemplary embodiments will be more readily understood from the following detailed description when read in conjunction with the appended drawing, in which:

FIG. 2 is a cross-sectional view of a first embodiment of an optical imaging lens having five lens elements according to the present disclosure;

FIG. 3 is a chart of longitudinal spherical aberration and other kinds of optical aberrations of a first embodiment of the optical imaging lens according to the present disclosure;

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 6 is a cross-sectional view of a second embodiment of an optical imaging lens having five lens elements according to the present disclosure;

FIG. 7 is a chart of longitudinal spherical aberration and other kinds of optical aberrations of a second embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 36 is a table of optical data for each lens element of the optical imaging lens of an ninth embodiment of the present disclosure;

FIG. 37 is a table of aspherical data of an ninth embodiment of the optical imaging lens according to the present disclosure;

FIG. 38 is a table for the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 of all nine example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
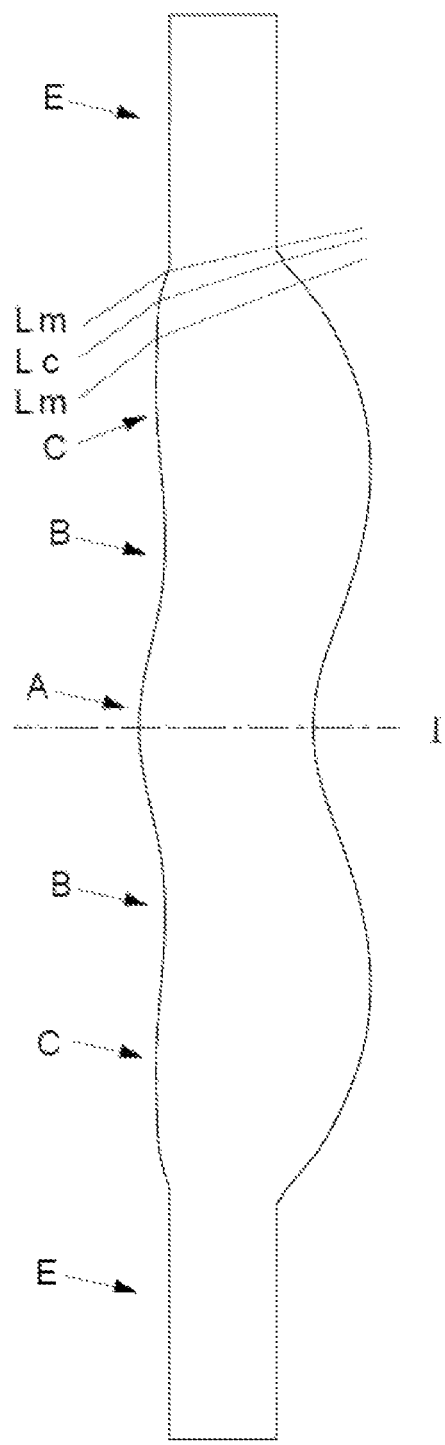
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, a fourth lens element and a fifth lens element, each of the lens elements comprises refracting power, an object-side surface facing toward an object side and an image-side surface facing toward an image side. These lens elements may be arranged sequentially from the object side to the image side along an optical axis, and example embodiments of the lens as a whole may comprise only the five lens elements having refracting power. Through controlling the convex or concave shape of the surfaces and/or the refraction power of the lens element(s), the camera device and the optical imaging lens thereof in exemplary embodiments achieve good optical characters and effectively broaden the shot angle of the optical imaging lens. In an example embodiment: the object-side surface of the first lens element comprises a convex portion in a vicinity of the optical axis; the image-side surface of the second lens element comprises a concave portion in a vicinity of a periphery of the second lens element; the image-side surface of the third lens element comprises a convex portion in a vicinity of the optical axis; the image-side surface of the fourth lens element comprises a concave portion in a vicinity of the optical axis; and the image-side surface of the fifth lens element comprises a convex portion in a vicinity of the optical axis.

Preferably, the lens elements are designed in light of the optical characteristics and the length of the optical imaging lens. For example, the first lens element formed with the convex portions in a vicinity of the optical axis on the object-side surface may assist in collecting light. All the details of shape on the surfaces of the lens elements listed here, such as the concave portions in a vicinity of a periphery of the second lens element formed on the image-side surface thereof, the concave surface formed on the object-side surface of the third lens element, the concave portion in a vicinity of the optical axis formed on the image-side surface of the fourth lens element and the convex portion in a vicinity of the optical axis formed on the image-side surface of the fifth lens element, the shot angle of the optical imaging lens could be further broadened and meanwhile good optical performance could be sustained.

In another exemplary embodiment, some equation(s) of parameters, such as those relating to the ratio among parameters could be taken into consideration. For example, the sum of the thickness of all five lens elements along the optical axis, ALT, and a central thickness of the fourth lens element along the optical axis, T4, could be controlled to satisfy the equation as follows:

$$5.5 \leq ALT/T4 \qquad \text{Equation (1); or}$$

A focal length of the third lens element, f3, and a focal length of the optical imaging lens, f or EFL, could be controlled to satisfy the equation as follows:

$$1.0 \leq |f3/f| \qquad \text{Equation (2); or}$$

A central thickness of the fifth lens element along the optical axis, T5, and the sum of all four air gaps from the first lens element to the fifth lens element along the optical axis, AAG, could be controlled to satisfy the equation as follows:

$$4.4 \leq AAG/T5 \qquad \text{Equation (3); or}$$

T5 and a central thickness of the third lens element along the optical axis, T3, could be controlled to satisfy the equation as follows:

$$1.0 \leq T3/T5 \qquad \text{Equation (4); or}$$

f, a focal length of the first lens element, f1, and a focal length of the second lens element, f2, could be controlled to satisfy the equation as follows:

$$7.5 \leq |f1/f| + |f2/f| \qquad \text{Equation (5); or}$$

T5 and a central thickness of the first lens element along the optical axis, T1, could be controlled to satisfy the equation as follows:

$$0.8 \leq T1/T5 \qquad \text{Equation (6); or}$$

T5 and an air gap between the third lens element and the fourth lens element along the optical axis, AG34, could be controlled to satisfy the equation as follows:

$$0.4 \leq AG34/T5 \qquad \text{Equation (7); or}$$

AG34 and ALT could be controlled to satisfy the equation as follows:

$$ALT/AG34 \leq 12.0 \qquad \text{Equation (8); or}$$

T4 and a back focal length of the optical imaging lens, i.e. the distance from the image-side surface of the fifth lens element to an image plane on the optical axis, BFL, could be controlled to satisfy the equation as follows:

$$4.1 \leq BFL/T4 \qquad \text{Equation (9); or}$$

T4 and AG34 could be controlled to satisfy the equation as follows:

$$1.8 \leq AG34/T4 \qquad \text{Equation (10); or}$$

f and the distance from the object-side surface of the first lens element to an image plane, TTL, could be controlled to satisfy the equation as follows:

$$3.5 \leq TTL/f \qquad \text{Equation (11); or}$$

AG34 and a central thickness of the second lens element along the optical axis, T2, could be controlled to satisfy the equation as follows:

$$0.6 \leq AG34/T2 \qquad \text{Equation (12); or}$$

An abbe number of the first lens element, V1, and an abbe number of the second lens element, V2, could be controlled to satisfy the equation as follows:

$$V1 - V2 \leq 20.0 \qquad \text{Equation (13); or}$$

V2 and an abbe number of the third lens element, V3, could be controlled to satisfy the equation as follows:

$$0.0 \leq V2 - V3 \qquad \text{Equation (14); or}$$

V1 and V3 could be controlled to satisfy the equation as follows:

$$20.0 \leq V1 - V3 \qquad \text{Equation (15).}$$

Aforesaid exemplary embodiments are not limited and could be selectively incorporated in other embodiments described herein.

Reference is now made to Equation (2). Considering that is |f3/f| is greater than or equal to 1.0, the configuration of the refracting power of each lens element could be better to share the refracting power of the third lens element, and this bring out the advantage of greater tolerance of manufacturing error. Here the value of |f3/f| is suggested to be greater than or equal to 1.0, and preferably, it is suggested to be within 3.0~15.0.

Reference is now made to Equation (5). Considering that if |f1/f|+|f2/f| is greater than or equal to 7.5, the configuration of the refracting power of each lens element could be better to share the refracting powers of the first and the second lens elements, and this bring out the advantage of greater tolerance of manufacturing error. Here, the value of |f1/f|+|f2/f| is suggested to be greater than or equal to 7.5, and preferably, it is suggested to be within 7.5~50.0.

Reference is now made to Equations (1), (3), (4), (6), (7), (9) and (10). Considering that the variety of the effective diameter for passing light in the first, fourth and fifth lens elements, which dominates the possibility for manufacturing thinner and slimmer lens element, the values of T4 and T5 has more chance to be lowered, and this makes the values of ALT/T4, AAG/T5, T3/T5, T1/T5, AG34/T5, BFL/T4 and AG34/T4 bigger. For example, effective diameter for passing light in the first lens element is usually greater than that of the fourth and fifth lens elements. Here, ALT/T4 is suggested to be greater than or equal to 5.5, and preferably, it is suggested to be within 5.5~45.5; AAG/T5 is suggested to be greater than or equal to 4.4, and preferably, it is suggested to be within 4.4~15.0; T3/T5 is suggested to be greater than or equal to 1.0, and preferably, it is suggested to be within 1.0~4.0; T1/T5 is suggested to be greater than or equal to 0.8, and preferably, it is suggested to be within 0.8~8.0; AG34/T5 is suggested to be greater than or equal to 0.4, and preferably, it is suggested to be within 0.4~5.0; BFL/T4 is suggested to be greater than or equal to 4.1, and preferably, it is suggested to be within 4.1~15.0; AG34/T4 is suggested to be greater than or equal to 1.8, and preferably, it is suggested to be within 1.8~18.0.

Reference is now made to Equations (8) and (12). Considering that the imaging quality is better if AG34 is designed for a certain value to converge the imaging light to a proper level before its entering the fourth lens element. Therefore, the value of ALT/AG34 is suggested for an upper limit, such as 12.0, and preferably, it is suggested to be within 1.0~12.0, and the value of AG34/T2 is suggested for a lower limit, such as 0.6, and preferably, it is suggested to be within 0.6~10.0.

Reference is now made to Equations (13), (14) and (15). In light of the combinations between the first, second and third lens element for eliminating aberration greater, here the value of V1−V2 is suggested for an upper limit, such as 20.0, and preferably, it is suggested to be limited by a lower limit, such as within −20.0~20.0; the value of V2−V3 is suggested for a lower limit, such as 0.0, and preferably, it is suggested to be limited by a lower limit, such as within −0~40.0; the value of V1−V3 is suggested for a lower limit, such as 20.0, and preferably, it is suggested to be limited by a lower limit, such as within 20.0~50.0.

Reference is now made to Equation (11). Considering providing a refracting power of the whole optical imaging lens strong enough to form an image in a limited space and meanwhile to provide a broadened view angle, here the value of TTL/f is suggested to be greater than or equal to 3.5, and preferably, it is suggested to be within 3.5~40.0.

When implementing example embodiments, more details about the convex or concave surface, refracting power and/or the position of an aperture stop could be incorporated for one specific lens element or broadly for plural lens elements to enhance the control for the system performance and/or resolution, such as forming the object-side surface of the third lens element as a concave surface, etc. It is noted that the details listed here could be incorporated in example embodiments if no inconsistency occurs.

Several exemplary embodiments and associated optical data will now be provided for illustrating example embodiments of optical imaging lens with good optical characters and a broadened shot angle. Reference is now made to FIGS. 2-5. FIG. 2 illustrates an example cross-sectional view of an optical imaging lens 1 having five lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, a second lens element 120, a third lens element 130, an aperture stop 100, a fourth lens element 140 and a fifth lens element 150. A filtering unit 160 and an image plane 170 of an image sensor are positioned at the image side A2 of the optical lens 1. Each of the first, second, third, fourth and fifth lens elements 110, 120, 130, 140, 150 and the filtering unit 160 comprises an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Please noted that during the normal operation of the optical imaging lens 1, the distance between any two adjacent lens elements of the first, second, third, fourth and fifth lens elements 110, 120, 130, 140, 150 is a unchanged value, i.e. the optical imaging lens 1 is a prime lens.

Exemplary embodiments of the optical imaging lens 1, wherein the first lens element 110 which may be constructed by glass material, and the second, third, fourth and fifth lens elements 120, 130, 140, 150, plastic material, will now be described with reference to the drawings.

An example embodiment of the first lens element 110 has negative refracting power. The object-side surface 111 is a convex surface comprising a convex portion 1111 in a vicinity of the optical axis. The image-side surface 112 is a concave surface.

An example embodiment of the second lens element 120 has negative refracting power. The object-side surface 121 is a convex surface. The image-side surface 122 is a concave surface comprising a concave portion 1221 in a vicinity of a periphery of the second lens element 120.

An example embodiment of the third lens element 130 has positive refracting power. The object-side surface 131 is a concave surface, and the image-side surface 132 is a convex surface comprising a convex portion 1321 in a vicinity of the optical axis.

An example embodiment of the fourth lens element 140 has negative refracting power. The object-side surface 141 is a convex surface. The image-side surface 142 is a concave surface comprising a concave portion 1421 in a vicinity of the optical axis.

An example embodiment of the fifth lens element 150 has positive refracting power. The object-side surface 151 is a convex surface. The image-side surface 152 is a convex surface comprising a convex portion 1521 in a vicinity of the optical axis.

In example embodiments, air gaps exist between the lens elements 110, 120, 130, 140, 150, the filtering unit 160 and the image plane 170 of the image sensor. For example, FIG. 2 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160 and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by AG12, the air gap d2 is denoted by AG23, the air gap d3 is denoted by AG34, the air gap d4 is denoted by AG45 and the sum of d1, d2, d3 and d4 is denoted by AAG.

FIG. 4 depicts the optical characters of each lens elements in the optical imaging lens 1 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:
ALT/T4=14.639;
|f3/f|=10.678;
AAG/T5=8.498;
T3/T5=2.223;
|f1/f|+|f2/f|=22.895;
T1/T5=1.324;
AG34/T5=1.976;
ALT/AG34=3.131;
BFL/T4=5.893;
AG34/T4=4.676;
TTL/EFL=24.299;
AG34/T2=1.625;
V1−V2=8.027;
V2−V3=32.848;
V1−V3=40.876.

The optical imaging lens 1 which shows that the distance from the object-side surface 111 of the first lens element 110 to the image plane 170 along the optical axis is 29.578 mm, the f-number is 2.0, EFL is 1.2173 mm, and the HFOV is 83.51, is capable to provide good imaging quality.

The object-side surface 111 and the image-side surface 112 of the first lens element 110 which is constructed by glass material are spherical surfaces. The aspherical surfaces, including the object-side surface 121 and the image-side surface 122 of the second lens element 120, the object-side surface 131 and the image-side surface 132 of the third lens element 130, the object-side surface 141 and the image-side surface 142 of the fourth lens element 140 and the object-side surface 151 and the image-side surface 152 of the fifth lens element 150, are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents an aspherical coefficient of $i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.05 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.10 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±90%.

Therefore, the optical imaging lens 1 of the present embodiment shows good optical characters to meet the requirements of the imaging quality. According to above illustration, the optical imaging lens 1 of the example embodiment, which is capable to provide 83.51 degrees of HFOV, indeed achieves great optical performance and the shot angle of the optical imaging lens 1 is effectively broadened.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, a second lens element 220, a third lens element 230, an aperture stop 200, a fourth lens element 240 and a fifth lens element 250.

The differences between the second embodiment and the first embodiment are the radius of curvature and thickness of each lens element and the distance of each air gap, but the configuration of the positive/negative refracting power of the first, second, third, fourth and fifth lens elements 210, 220, 230, 240, 250 and configuration of the concave/convex shape of surfaces, comprising the object-side surfaces 211, 221, 231, 241, 251 facing to the object side A1 and the image-side surfaces 212, 222, 232, 242, 252 facing to the image side A2, are similar to those in the first embodiment. Please refer to FIG. 8 for the optical characteristics of each lens elements in the optical imaging lens 2 the present embodiment, the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=19.992;
|f3/f|=10.187;
AAG/T5=9.884;
T3/T5=3.343;
|f1/f|+|f2/f|=39.414;
T1/T5=3.429;
AG34/T5=0.897;
ALT/AG34=10.637;
BFL/T4=4.776;
AG34/T4=1.880;
TTL/EFL=32.234;
AG34/T2=0.692;
V1−V2=8.027;
V2−V3=32.848;
V1−V3=40.876.

The optical imaging lens 2 which shows that the distance from the object-side surface 211 of the first lens element 210 to the image plane 270 along the optical axis is 45.071 mm, the f-number is 2.0, EFL is 1.3982 mm, and the HFOV is 81.10, is capable to provide good imaging quality.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 2 of the present embodiment, which is capable to provide 81.10 degrees of HFOV, indeed achieves great optical performance and the shot angle of the optical imaging lens 2 is effectively broadened.

Figure 10:
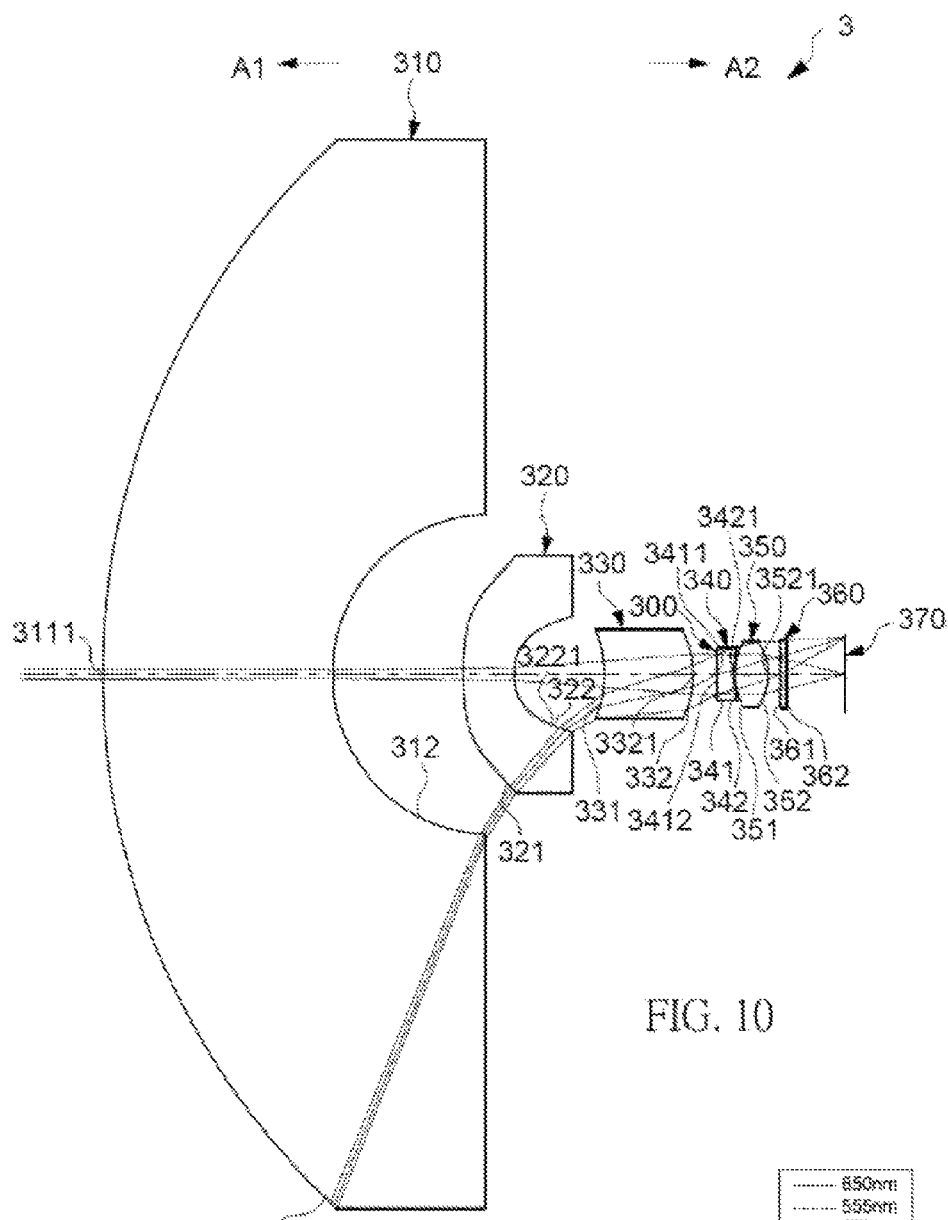
FIG. 10 is a cross-sectional view of a third embodiment of an optical imaging lens having five lens elements according to the present disclosure.
Figure 11:
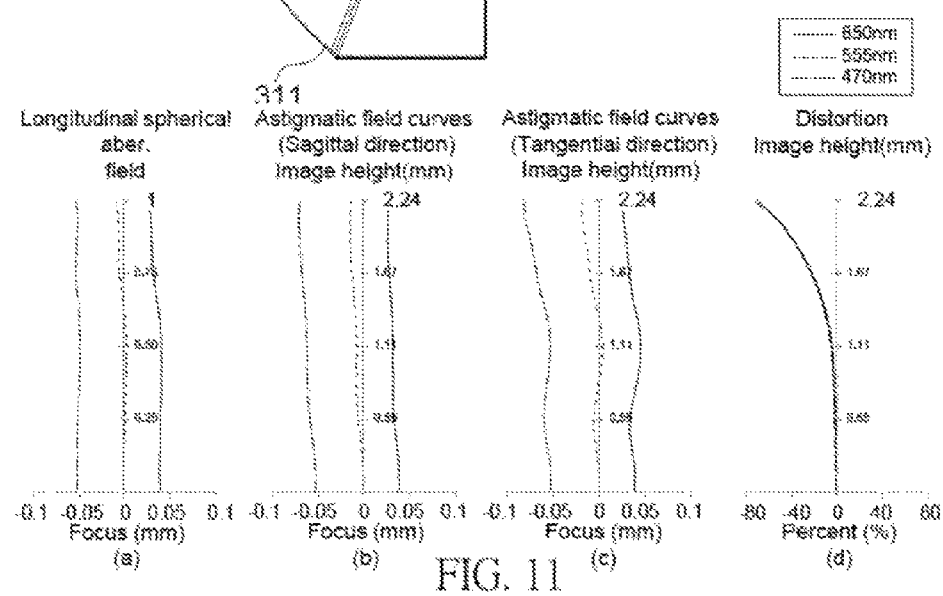
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, a second lens element 320, a third lens element 330, an aperture stop 300, a fourth lens element 340 and a fifth lens element 350.

The differences between the third embodiment and the first embodiment are the radius of curvature and thickness of each lens element, the distance of each air gap and the configuration of the concave/convex shape of the object-side surface 341, but the configuration of the positive/negative refracting power of the first, second, third, fourth and fifth lens elements 310, 320, 330, 340, 350 and configuration of the concave/convex shape of surfaces, comprising the object-side surfaces 311, 321, 331, 351 facing to the object side A1 and the image-side surfaces 312, 322, 332, 342, 352 facing to the image side A2, are similar to those in the first embodiment. Specifically, the object-side surface 341 of the fourth lens element 340 comprises a convex portion 3411 in a vicinity of the optical axis and a concave portion 3412 in a vicinity of a periphery of the fourth lens element 340. Please refer to FIG. 12 for the optical characteristics of each lens elements in the optical imaging lens 3 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=25.509;
|f3/f|=9.854;
AAG/T5=7.587;
T3/T5=2.731;
|f1/f|+|f2/f|=25.928;
T1/T5=7.071;
AG34/T5=0.735;
ALT/AG34=17.496;
BFL/T4=4.738;
AG34/T4=1.458;
TTL/EFL=33.025;
AG34/T2=0.472;
V1−V2=8.027;
V2−V3=32.848;
V1−V3=40.876.

The optical imaging lens 3 which shows that the distance from the object-side surface 311 of the first lens element 310 to the image plane 370 along the optical axis is 45.114 mm, the f-number is 2.0, EFL is 1.3660 mm, and the HFOV is 79.64, is capable to provide good imaging quality.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 3 of the present embodiment, which is capable to provide 79.64 degrees of HFOV, indeed achieves great optical performance and the shot angle of the optical imaging lens 3 is effectively broadened.

Figure 14:
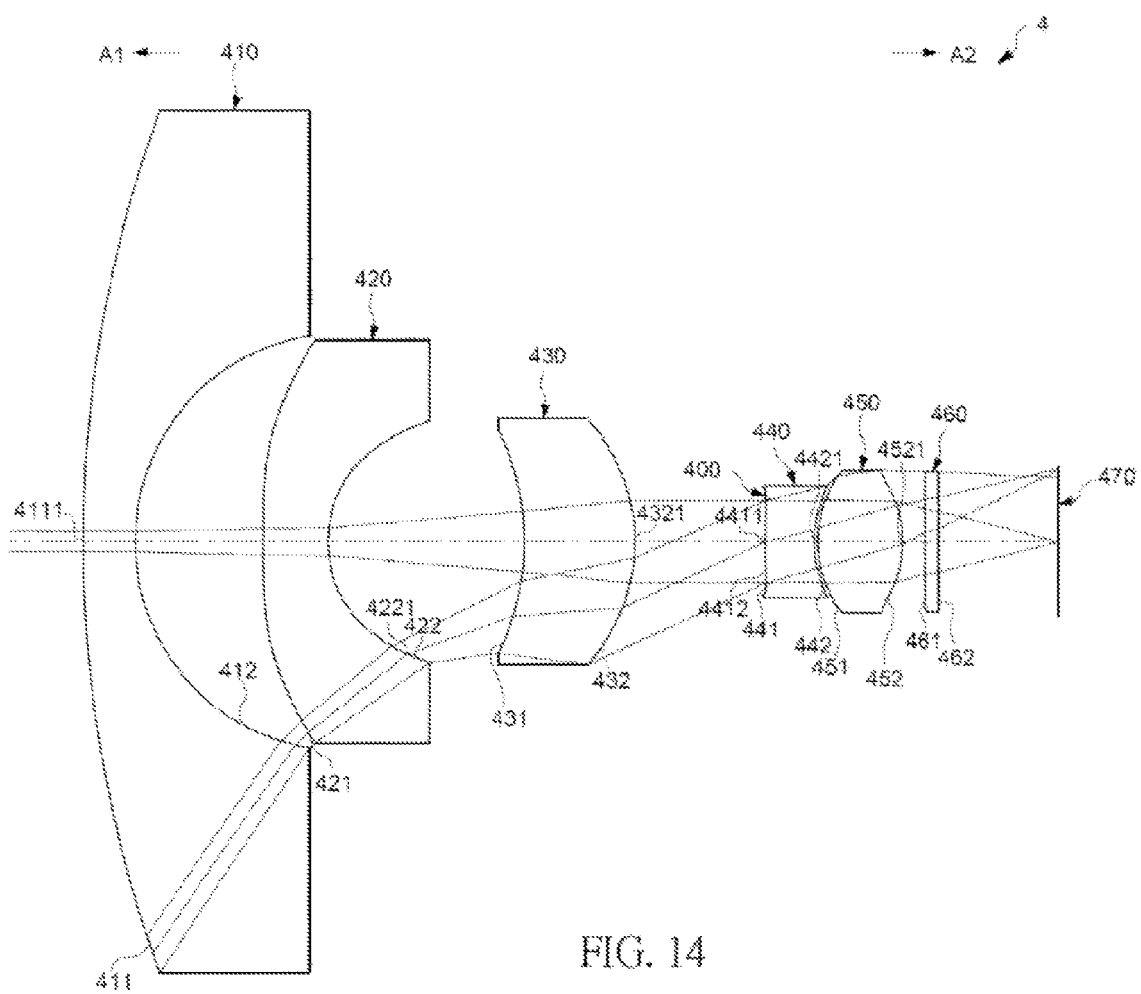
FIG. 14 is a cross-sectional view of a fourth embodiment of an optical imaging lens having five lens elements according to the present disclosure.
Figure 15:
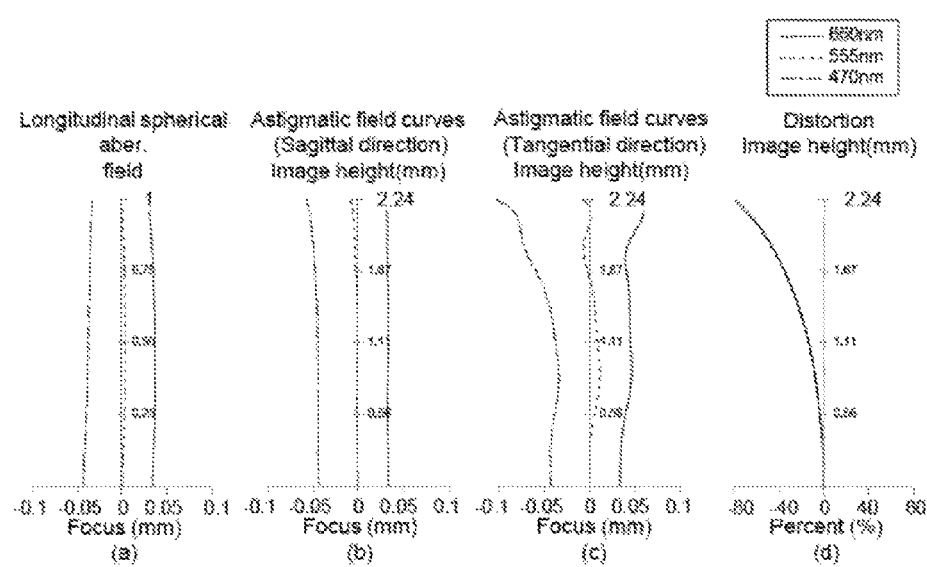
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, a second lens element 420, a third lens element 430, an aperture stop 400, a fourth lens element 440 and a fifth lens element 450.

The differences between the fourth embodiment and the first embodiment are the radius of curvature and thickness of each lens element, the distance of each air gap and the configuration of the concave/convex shape of the object-side surface 341, but the configuration of the positive/negative refracting power of the first, second, third, fourth and fifth lens elements 410, 420, 430, 440, 450 and configuration of the concave/convex shape of surfaces, comprising the object-side surfaces 411, 421, 431, 451 facing to the object side A1 and the image-side surfaces 412, 422, 432, 442, 452 facing to the image side A2, are similar to those in the first embodiment. Specifically, the object-side surface 441 of the fourth lens element 440 comprises a convex portion 4411 in a vicinity of the optical axis and a concave portion 4412 in a vicinity of a periphery of the fourth lens element 440. Please refer to FIG. 16 for the optical characteristics of each lens elements in the optical imaging lens 4 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=7.318;
|f3/f|=11.571;
AAG/T5=5.381;
T3/T5=1.304;
|f1/f|+|f2/f|=16.898;
T1/T5=0.609;
AG34/T5=1.538;
ALT/AG34=2.766;
BFL/T4=3.163;
AG34/T4=2.646;
TTL/EFL=22.898;
AG34/T2=2.024;
V1−V2=8.027;
V2−V3=32.848;
V1−V3=40.876.

The optical imaging lens 4 which shows that the distance from the object-side surface 411 of the first lens element 410 to the image plane 470 along the optical axis is 30.154 mm, the f-number is 2.0, EFL is 1.31690 mm, and the HFOV is 82.86, is capable to provide good imaging quality.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 4 of the present embodiment, which is capable to provide 82.86 degrees of HFOV, indeed achieves great optical performance and the shot angle of the optical imaging lens 4 is effectively broadened.

Figure 18:
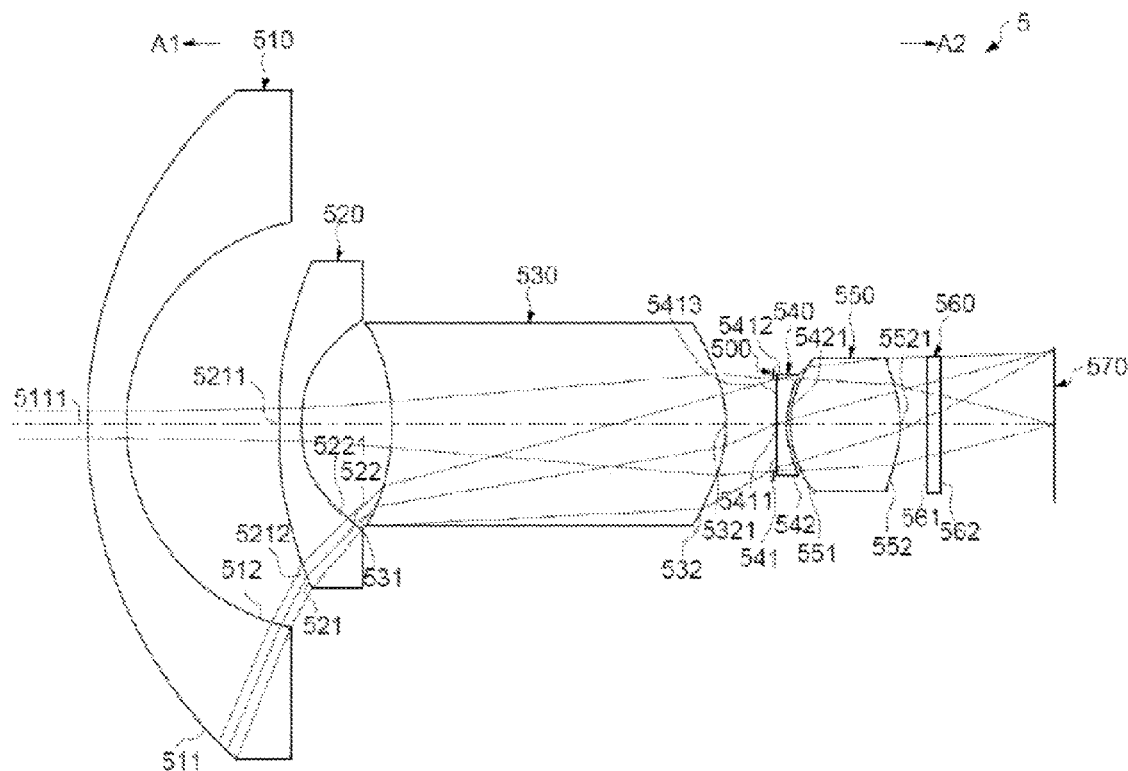
FIG. 18 is a cross-sectional view of a fifth embodiment of an optical imaging lens having five lens elements according to the present disclosure.
Figure 19:
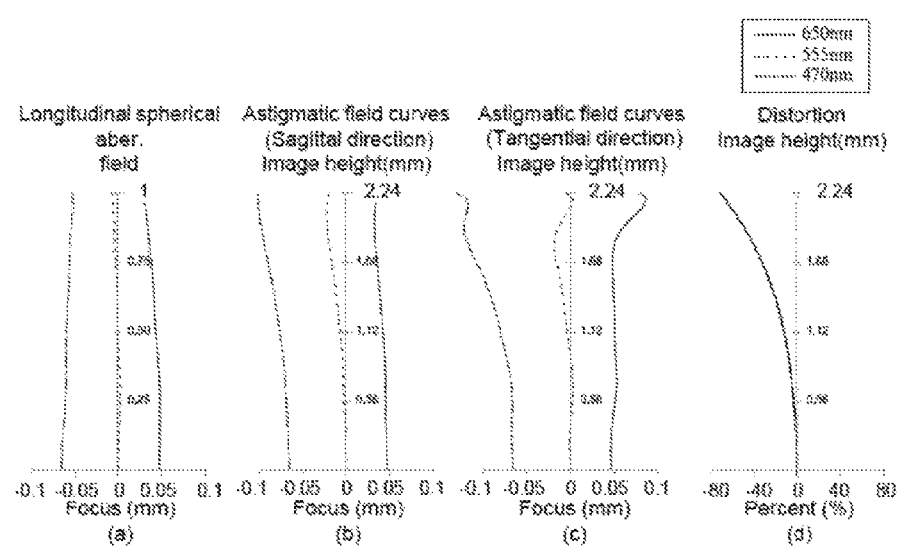
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, a second lens element 520, a third lens element 530, an aperture stop 500, a fourth lens element 540 and a fifth lens element 550.

The differences between the fifth embodiment and the first embodiment are the radius of curvature and thickness of each lens element, the distance of each air gap and the configuration of the concave/convex shape of the object-side surfaces 521, 541, but the configuration of the positive/negative refracting power of the first, second, third, fourth and fifth lens elements 510, 520, 530, 540, 550 and configuration of the concave/convex shape of surfaces, comprising the object-side surfaces 511, 531, 551 facing to the object side A1 and the image-side surfaces 512, 522, 532, 542, 552 facing to the image side A2, are similar to those in the first embodiment. Specifically, the object-side surface 521 of the second lens element 520 comprises a concave portion 5211 in a vicinity of the optical axis and a convex portion 5212 in a vicinity of a periphery of the second lens element 520, and the object-side surface 541 of the fourth lens element 540 comprises a concave portion 5411 in a vicinity of the optical axis, a concave portion 5412 in a vicinity of a periphery of the fourth lens element 540 and a convex portion 5413 between the vicinity of the optical axis and the vicinity of the periphery of the fourth lens element 540. Please refer to FIG. 20 for the optical characteristics of each lens elements in the optical imaging lens 5 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=49.841;
|f3/f|=3.276;
AAG/T5=2.713;
T3/T5=3.044;
|f1/f|+|f2/f|=19.192;
T1/T5=0.353;
AG34/T5=0.435;
ALT/AG34=10.772;
BFL/T4=15.041;
AG34/T4=4.627;
TTL/EFL=17.573;
AG34/T2=2.215;
V1−V2=8.027;
V2−V3=32.848;
V1−V3=40.876.

The optical imaging lens 5 which shows that the distance from the object-side surface 511 of the first lens element 510 to the image plane 570 along the optical axis is 28.982 mm, the f-number is 2.0, EFL is 1.6493 mm, and the HFOV is 77.59, is capable to provide good imaging quality.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 5 of the present embodiment, which is capable to provide 77.59 degrees of HFOV, indeed achieves great optical performance and the shot angle of the optical imaging lens 5 is effectively broadened.

Figure 22:
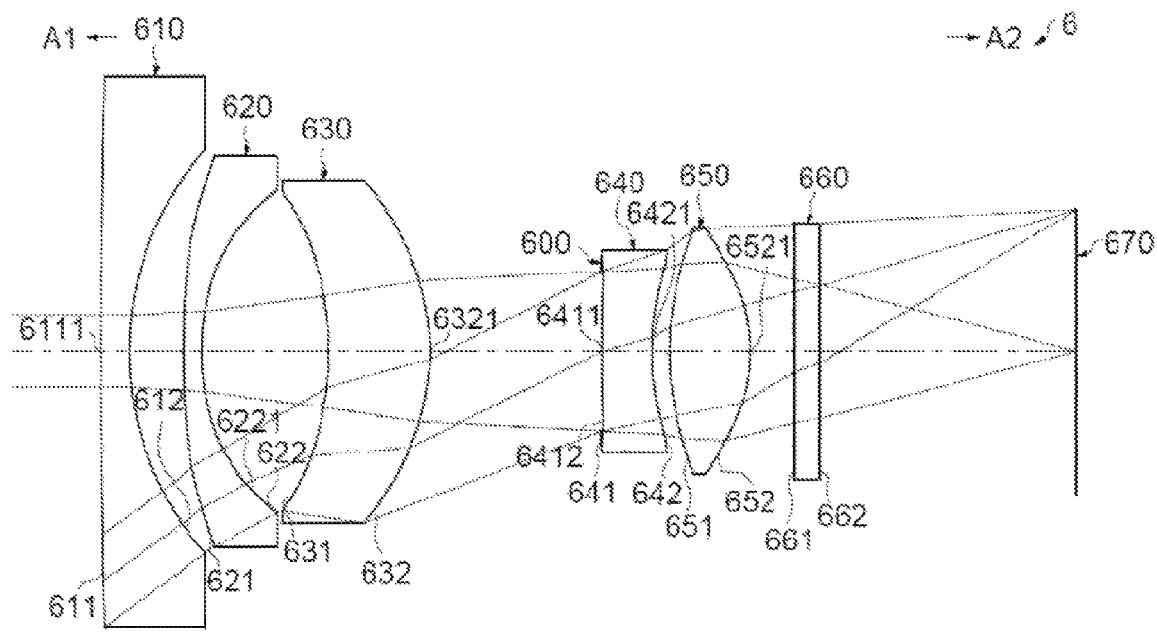
FIG. 22 is a cross-sectional view of a sixth embodiment of an optical imaging lens having five lens elements according to the present disclosure.
Figure 23:
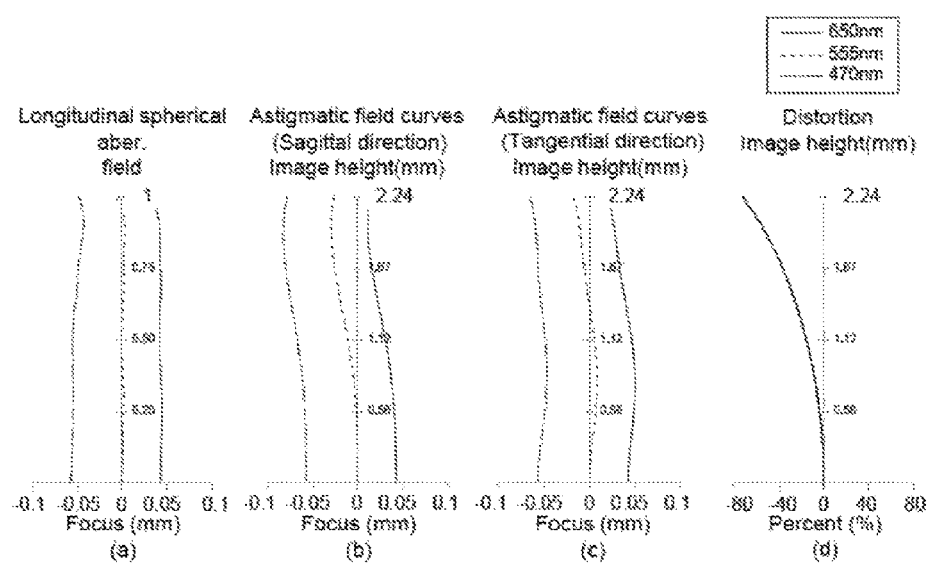
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, a second lens element 620, a third lens element 630, an aperture stop 600, a fourth lens element 640 and a fifth lens element 650.

The differences between the sixth embodiment and the first embodiment are the radius of curvature and thickness of each lens element, the distance of each air gap and the configuration of the concave/convex shape of the object-side surface 641, but the configuration of the positive/negative refracting power of the first, second, third, fourth and fifth lens elements 610, 620, 630, 640, 650 and configuration of the concave/convex shape of surfaces, comprising the object-side surfaces 611, 621, 631, 651 facing to the object side A1 and the image-side surfaces 612, 622, 632, 642, 652 facing to the image side A2, are similar to those in the first embodiment. Specifically, the object-side surface 641 of the fourth lens element 640 comprises a convex portion 6411 in a vicinity of the optical axis and a concave portion 6412 in a vicinity of a periphery of the fourth lens element 640. Please refer to FIG. 24 for the optical characteristics of each lens elements in the optical imaging lens 6 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=5.590;
|f3/f|=5.400;
AAG/T5=4.595;
T3/T5=1.256;
|f1/f|+|f2/f|=8.294;
T1/T5=0.352;
AG34/T5=2.125;
ALT/AG34=1.629;
BFL/T4=6.602;
AG34/T4=3.432;
TTL/EFL=6.718;
AG34/T2=9.060;
V1−V2=8.027;
V2−V3=32.848;
V1−V3=40.876.

The optical imaging lens 6 which shows that the distance from the object-side surface 611 of the first lens element 610 to the image plane 670 along the optical axis is 15.535 mm, the f-number is 2.0, EFL is 2.3126 mm, and the HFOV is 60.31, is capable to provide good imaging quality.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 6 of the present embodiment, which is capable to provide 60.31 degrees of HFOV, indeed achieves great optical performance and the shot angle of the optical imaging lens 6 is effectively broadened.

Figure 26:
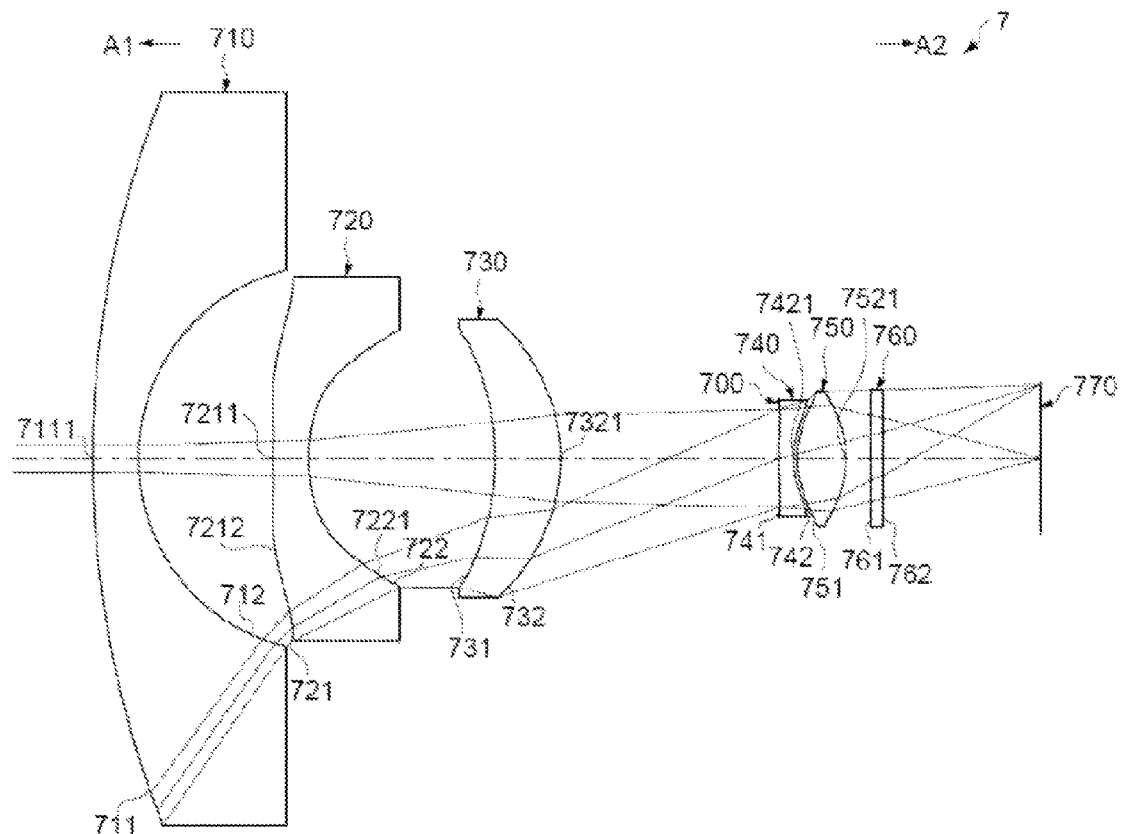
FIG. 26 is a cross-sectional view of a seventh embodiment of an optical imaging lens having five lens elements according to the present disclosure.
Figure 27:
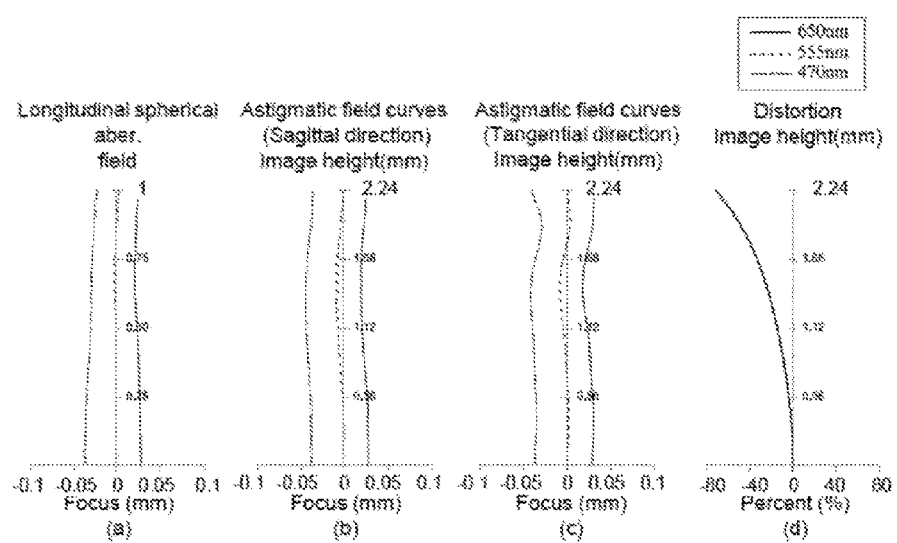
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having five lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, a second lens element 720, a third lens element 730, an aperture stop 700, a fourth lens element 740 and a fifth lens element 750.

The differences between the seventh embodiment and the first embodiment are the radius of curvature and thickness of each lens element, the distance of each air gap and the configuration of the concave/convex shape of the object-side surface 721, but the configuration of the positive/negative refracting power of the first, second, third, fourth and fifth lens elements 710, 720, 730, 740, 750 and configuration of the concave/convex shape of surfaces, comprising the object-side surfaces 711, 731, 741, 751 facing to the object side A1 and the image-side surfaces 712, 722, 732, 742, 752 facing to the image side A2, are similar to those in the first embodiment. Specifically, the object-side surface 721 of the second lens element 720 comprises a concave portion 7211 in a vicinity of the optical axis and a convex portion 7212 in a vicinity of a periphery of the second lens element 720. Please refer to FIG. 28 for the optical characteristics of each lens elements in the optical imaging lens 7 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:
ALT/T4=13.571;
|f3/f|=11.091;
AAG/T5=11.265;
T3/T5=1.358;
|f1/f|+|f2/f|=13.610;
T1/T5=0.950;
AG34/T5=4.524;
ALT/AG34=0.965;
BFL/T4=12.613;
AG34/T4=14.068;
TTL/EFL=17.194;
AG34/T2=6.156;
V1−V2=7.868;
V2−V3=29.621;
V1−V3=37.490.

The optical imaging lens 7 which shows that the distance from the object-side surface 711 of the first lens element 710 to the image plane 770 along the optical axis is 29.003 mm, the f-number is 2.0, EFL is 1.6867 mm, and the HFOV is 77.72, is capable to provide good imaging quality.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 7 of the present embodiment, which is capable to provide 77.72 degrees of HFOV, indeed achieves great optical performance and the shot angle of the optical imaging lens 7 is effectively broadened.

Figure 30:
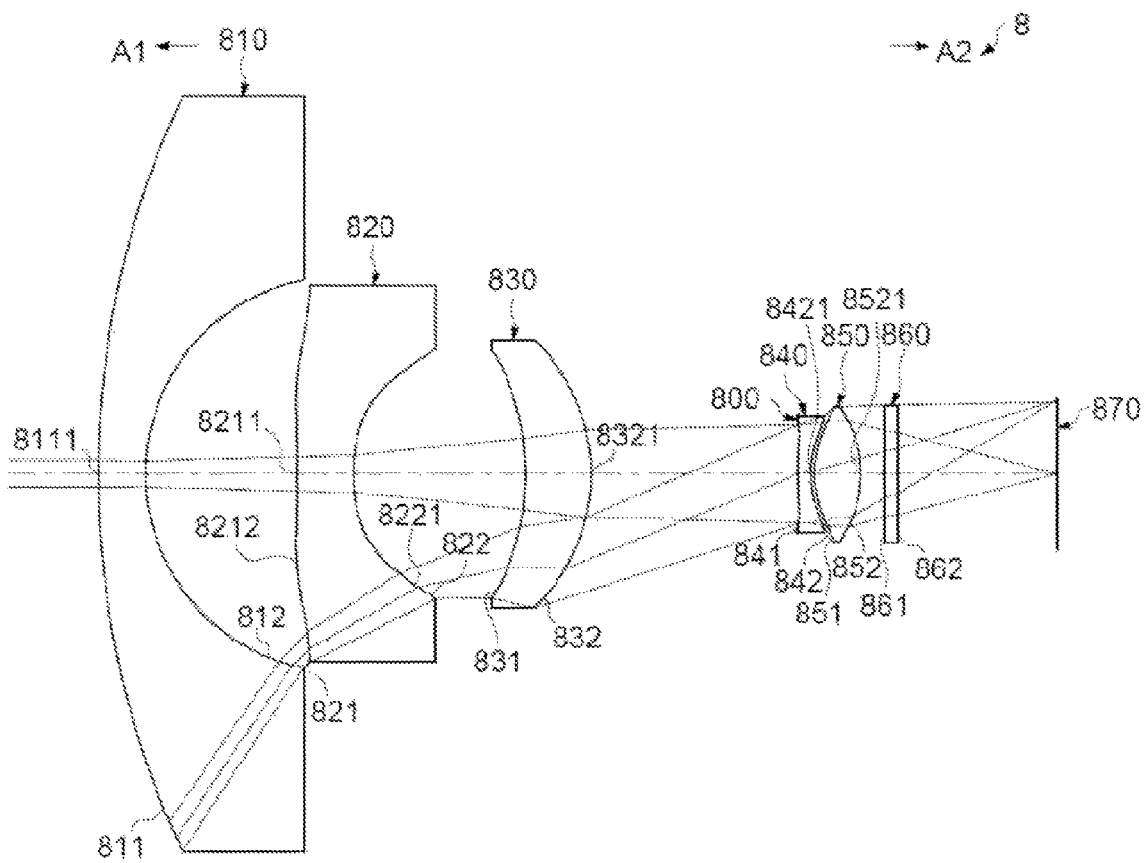
FIG. 30 is a cross-sectional view of an eighth embodiment of an optical imaging lens having five lens elements according to the present disclosure.
Figure 31:
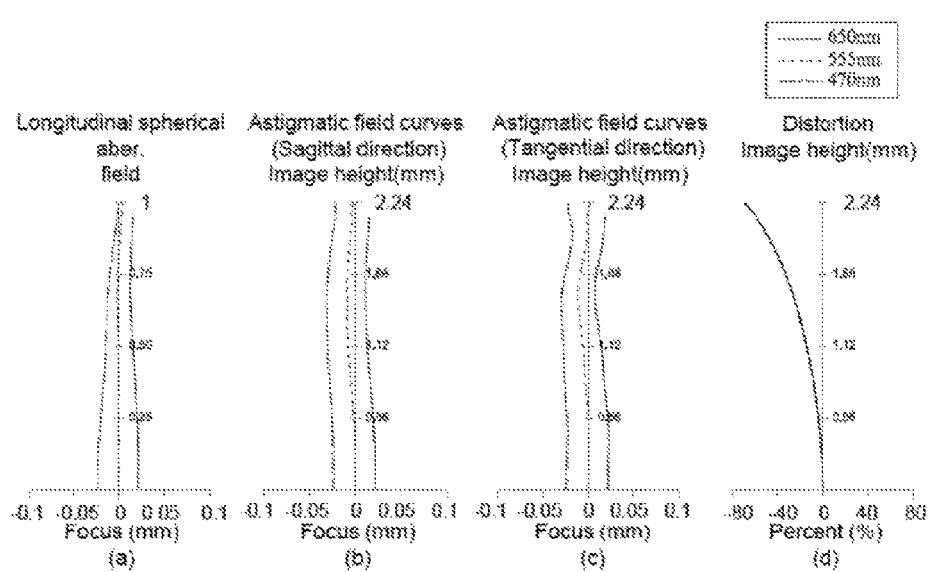
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having five lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, a second lens element 820, a third lens element 830, an aperture stop 800, a fourth lens element 840 and a fifth lens element 850.

The differences between the eighth embodiment and the first embodiment are the radius of curvature and thickness of each lens element, the distance of each air gap and the configuration of the concave/convex shape of the object-side surface 821, but the configuration of the positive/negative refracting power of the first, second, third, fourth and fifth lens elements 810, 820, 830, 840, 850 and configuration of the concave/convex shape of surfaces, comprising the object-side surfaces 811, 831, 841, 851 facing to the object side A1 and the image-side surfaces 812, 822, 832, 842, 852 facing to the image side A2, are similar to those in the first embodiment. Specifically, the object-side surface 821 of the second lens element 820 comprises a concave portion 8211 in a vicinity of the optical axis and a convex portion 8212 in a vicinity of a periphery of the second lens element 820. Please refer to FIG. 32 for the optical characteristics of each lens elements in the optical imaging lens 8 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=17.072;
|f3/f|=10.478;
AAG/T5=11.479;
T3/T5=1.426;
|f1/f|+|f2/f|=13.815;
T1/T5=1.018;
AG34/T5=4.438;
ALT/AG34=1.116;
BFL/T4=14.635;
AG34/T4=15.296;
TTL/EFL=17.294;
AG34/T2=3.640;
V1−V2=7.868;
V2−V3=32.372;
V1−V3=40.240.

The optical imaging lens 8 which shows that the distance from the object-side surface 811 of the first lens element 810 to the image plane 870 along the optical axis is 29.002 mm, the f-number is 2.0, EFL is 1.6770 mm, and the HFOV is 76.60, is capable to provide good imaging quality.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 8 of the present embodiment, which is capable to provide 76.60 degrees of HFOV, indeed achieves great optical performance and the shot angle of the optical imaging lens 8 is effectively broadened.

Figure 34:
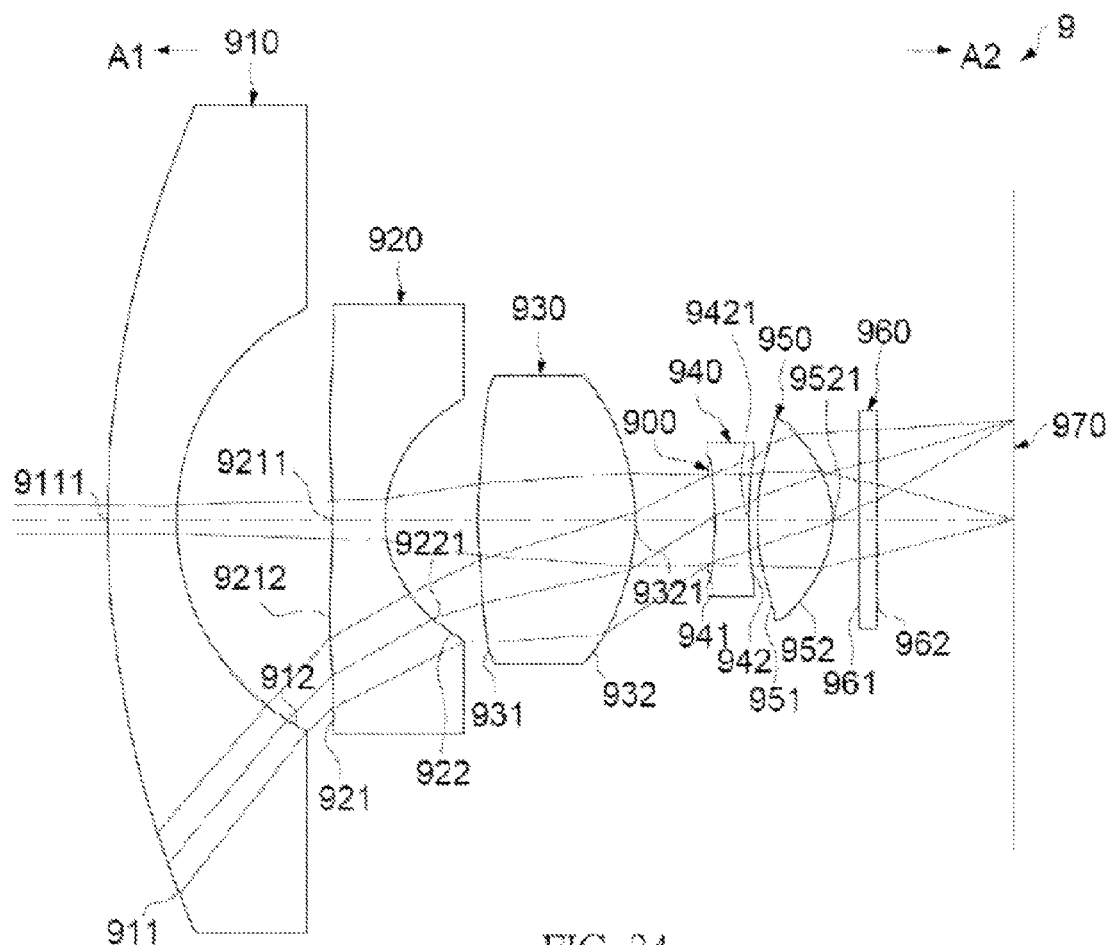
FIG. 34 is a cross-sectional view of an ninth embodiment of an optical imaging lens having five lens elements according to the present disclosure.
Figure 35:
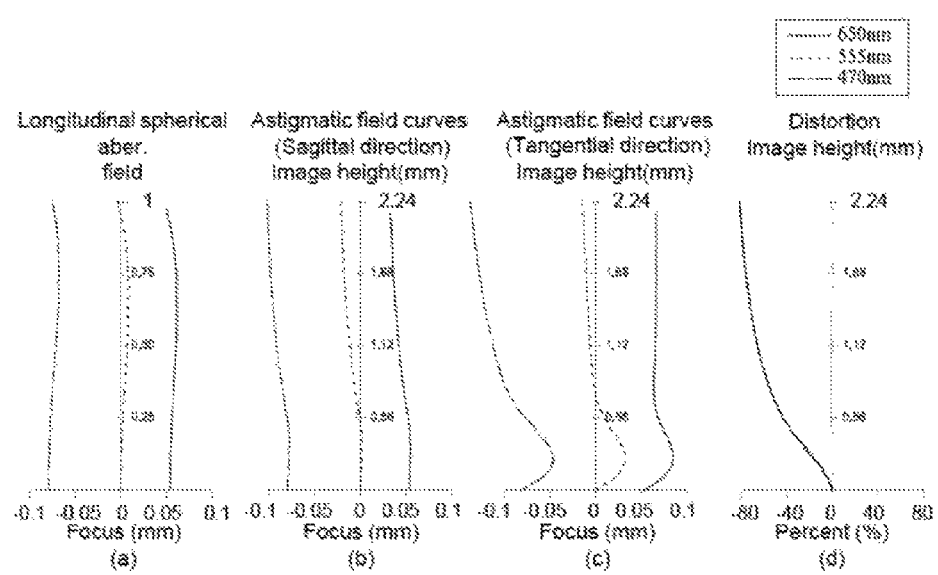
FIG. 35 is a chart of longitudinal spherical aberration and other kinds of optical aberrations of an ninth embodiment of the optical imaging lens according the present disclosure.

Reference is now made to FIGS. 34-37. FIG. 34 illustrates an example cross-sectional view of an optical imaging lens 9 having five lens elements of the optical imaging lens according to an ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises a first lens element 910, a second lens element 920, a third lens element 930, an aperture stop 900, a fourth lens element 940 and a fifth lens element 950.

The differences between the ninth embodiment and the first embodiment are the radius of curvature and thickness of each lens element, the distance of each air gap and the configuration of the concave/convex shape of the object-side surfaces 921, 931, 941, but the configuration of the positive/negative refracting power of the first, second, third, fourth and fifth lens elements 910, 920, 930, 940, 950 and configuration of the concave/convex shape of surfaces, comprising the object-side surfaces 911, 951 facing to the object side A1 and the image-side surfaces 912, 922, 932, 942, 952 facing to the image side A2, are similar to those in the first embodiment. Specifically, the object-side surface 921 of the second lens element 920 comprises a concave portion 9211 in a vicinity of the optical axis and a convex portion 9212 in a vicinity of a periphery of the second lens element 920; the object-side surface 931 of the third lens element 930 is a convex surface; the object-side surface 941 of the fourth lens element 940 is a concave surface. Please refer to FIG. 36 for the optical characteristics of each lens elements in the optical imaging lens 9 of the present embodiment, wherein the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 are:

ALT/T4=9.700;
|f3/f|=4.141;
AAG/T5=4.437;
T3/T5=2.106;
|f1/f|+|f2/f|=9.983;
T1/T5=0.928;
AG34/T5=0.979;
ALT/AG34=5.400;
BFL/T4=4.478;
AG34/T4=1.796;
TTL/EFL=15.350;
AG34/T2=1.383;
V1−V2=−6.490;
V2−V3=32.848;
V1−V3=26.358.

The optical imaging lens 9 which shows that the distance from the object-side surface 911 of the first lens element 910 to the image plane 970 along the optical axis is 20.613 mm, the f-number is 2.0, EFL is 1.6770 mm, and the HFOV is 83.64, is capable to provide good imaging quality.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 9 of the present embodiment, which is capable to provide 83.64 degrees of HFOV, indeed achieves great optical performance and the shot angle of the optical imaging lens 9 is effectively broadened.

Please refer to FIG. 38, which shows the values of ALT/T4, |f3/f|, AAG/T5, T3/T5, |f1/f|+|f2/f|, T1/T5, AG34/T5, ALT/AG34, BFL/T4, AG34/T4, TTL/EFL, AG34/T2, V1−V2, V2−V3 and V1−V3 of all nine embodiments, and it is clear that the optical imaging lens of the present invention satisfy the Equations (1), (2), (3), (4), (5), (6), (7), (8), (9), (10), (11), (12), (13), (14) and/or (15).

Figure 39:
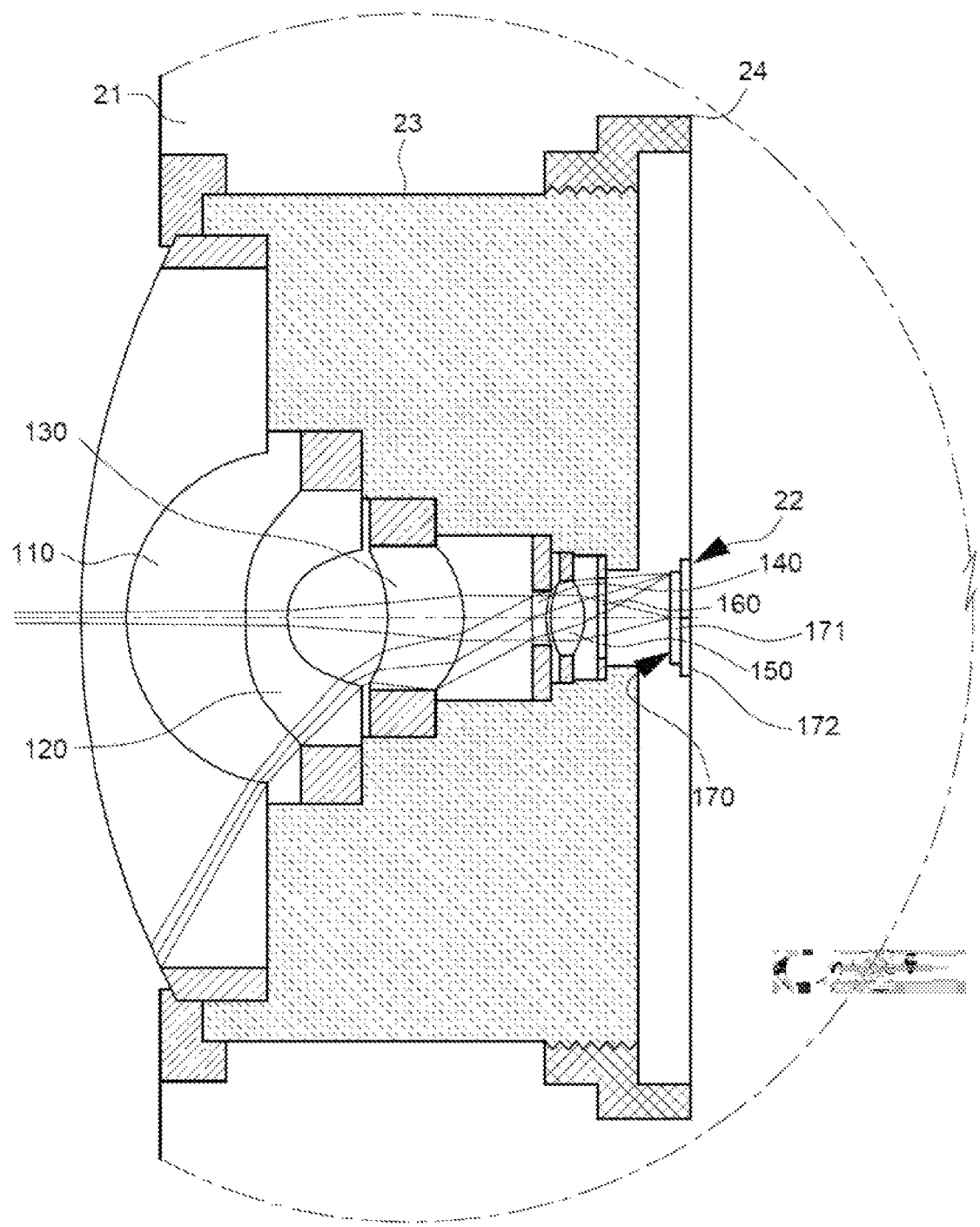
FIG. 39 is a structure of an example embodiment of a camera device.

Reference is now made to FIG. 39, which illustrates an example structural view of a first embodiment of camera device 20 applying an aforesaid optical imaging lens. The camera device 20 comprises a housing 21 and a photography module 22 positioned in the housing 21. Examples of the camera device 20 may be, but are not limited to, gaming machines, such as video game consoles, handhold game console, etc., event data recorders, reversing camera systems mounted on motor vehicles, wide-angle camera, etc.

As shown in FIG. 39, the photography module 22 may comprise an aforesaid optical imaging lens with five lens elements, which is a prime lens and for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

Because in the optical imaging lens 1, the distance between the object-side surface 111 of the first lens element 110 and the image plane 170 along the optical axis is 29.578 mm, the f-number is 2.0, EFL is 1.2173, and the HFOV is as high as 83.51 degrees, the imaging quality is good. Therefore, compared with current camera devices, the camera device of the present embodiment, which is capable to provide 83.51 degrees of HFOV, indeed achieves good optical characters as well as image quality.

According to above illustration, it is clear that the camera device and the optical imaging lens thereof in example embodiments, through controlling the detail structure of the lens elements, the shot angle of the optical imaging lens is effectively broadened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of said first, second, third, fourth and fifth lens elements having refracting power, an object-side surface facing toward the object side and an image-side surface facing toward the image side, wherein:

said object-side surface of said first lens element comprises a convex portion in a vicinity of the optical axis;

said image-side surface of said second lens element comprises a concave portion in a vicinity of a periphery of the second lens element;

said image-side surface of said third lens element comprises a convex portion in a vicinity of the optical axis;

said image-side surface of said fourth lens element comprises a concave portion in a vicinity of the optical axis;

said image-side surface of said fifth lens element comprises a convex portion in a vicinity of the optical axis;

an abbe number of the first lens element is V1, an abbe number of the third lens element is V3, and V1 and V3 satisfy the equation:

$20.0 \le V1 - V3$; and a central thickness of the third lens element along the optical axis is T3, a central thickness of the fifth lens element along the optical axis is T5, and T3 and T5 satisfy the equation:

$1.0 \le T3/T5$.

2. The optical imaging lens according to claim 1, wherein the sum of the thickness of all five lens elements along the optical axis is ALT, a central thickness of the fourth lens element along the optical axis is T4, and T4 and ALT satisfy the equation:

$5.5 \le ALT/T4$.

3. The optical imaging lens according to claim 2, wherein a focal length of the third lens element is f3, a focal length of the optical imaging lens is f, and f3 and f satisfy the equation:

$1.0 \le |f3/f|$.

4. The optical imaging lens according to claim 3, wherein the object-side surface of the third lens element is a concave surface.

5. The optical imaging lens according to claim 4, wherein an abbe number of the first lens element is V1, an abbe number of the second lens element is V2, and V1 and V2 satisfy the equation:

$V1 - V2 \le 20.0$.

6. The optical imaging lens according to claim 3, wherein a focal length of the first lens element is f1, a focal length of the second lens element is f2, and f1, f2 and f satisfy the equation:

$7.5 \le |f1/f| + |f2/f|$.

7. The optical imaging lens according to claim 6, wherein a central thickness of the first lens element along the optical axis is T1, and T1 and T5 satisfy the equation:

$0.8 \leq T1/T5$.

8. The optical imaging lens according to claim 1, wherein a focal length of the third lens element is f3, a focal length of the optical imaging lens is f, and f3 and f satisfy the equation:

$1.0 \leq |f3/f|$.

9. The optical imaging lens according to claim 8, wherein the sum of all four air gaps from the first lens element to the fifth lens element along the optical axis is AAG, and T5 and AAG satisfy the equation:

$4.4 \leq AAG/T5$.

10. The optical imaging lens according to claim 9, wherein an air gap between the third lens element and the fourth lens element along the optical axis is AG34, and T5 and AG34 satisfy the equation:

$0.4 \leq AG34/T5$.

11. The optical imaging lens according to claim 9, wherein an abbe number of the second lens element is V2, an abbe number of the third lens element is V3, and V2 and V3 satisfy the equation:

$0.0 \leq V2-V3$.

12. The optical imaging lens according to claim 9, wherein an air gap between the third lens element and the fourth lens element along the optical axis is AG34, the sum of the thickness of all five lens elements along the optical axis is ALT, and AG34 and ALT satisfy the equation:

$ALT/AG34 \leq 12.0$.

13. The optical imaging lens according to claim 1, wherein the sum of all four air gaps from the first lens element to the fifth lens element along the optical axis is AAG, and T5 and AAG satisfy the equation:

$4.4 \leq AAG/T5$.

14. The optical imaging lens according to claim 13, wherein a central thickness of the fourth lens element along the optical axis is T4, a back focal length of the optical imaging lens, i.e. the distance from the image-side surface of the fifth lens element to an image plane on the optical axis is BFL, and T4 and BFL satisfy the equation:

$4.1 \leq BFL/T4$.

15. The optical imaging lens according to claim 14, wherein an air gap between the third lens element and the fourth lens element along the optical axis is AG34, and T4 and AG34 satisfy the equation:

$1.8 \leq AG34/T4$.

16. The optical imaging lens according to claim 13, wherein a focal length of the optical imaging lens is f, the distance from the object-side surface of the first lens element to an image plane is TTL, and f and TTL satisfy the equation:

$3.5 \leq TTL/f$.

17. The optical imaging lens according to claim 16, wherein a central thickness of the second lens element along the optical axis is T2, an air gap between the third lens element and the fourth lens element along the optical axis is AG34, and T4 and AG34 satisfy the equation:

$0.6 \leq AG34/T2$.

18. A camera device, comprising:
a housing; and
a photography module positioned in the housing and comprising:
an optical imaging lens, sequentially from an object side to an image side along an optical axis, comprising first, second, third, fourth and fifth lens elements, each of said first, second, third, fourth and fifth lens elements having refracting power, an object-side surface facing toward the object side and an image-side surface facing toward the image side, wherein:
said object-side surface of said first lens element comprises a convex portion in a vicinity of the optical axis;
said image-side surface of said second lens element comprises a concave portion in a vicinity of a periphery of the second lens element;
said image-side surface of said third lens element comprises a convex portion in a vicinity of the optical axis;
said image-side surface of said fourth lens element comprises a concave portion in a vicinity of the optical axis;
said image-side surface of said fifth lens element comprises a convex portion in a vicinity of the optical axis;
an abbe number of the first lens element is V1, an abbe number of the third lens element is V3, and V1 and V3 satisfy the equation:

$20.0 \leq V1-V3$; and a central thickness of the third lens element along the optical axis is T3, a central thickness of the fifth lens element along the optical axis is T5, and T3 and T5 satisfy the equation:

$1.0 \leq T3/T5$;

a lens barrel for positioning the optical imaging lens;
a module housing unit for positioning the lens barrel; and
an image sensor positioned at the image side of the optical imaging lens.

* * * * *